United States Patent
Ross et al.

(10) Patent No.: US 12,535,029 B2
(45) Date of Patent: *Jan. 27, 2026

(54) ASSEMBLIES FOR ENGINES

(71) Applicant: ASTON MARTIN LAGONDA LIMITED, Warwick (GB)

(72) Inventors: Joerg Ross, Warwick (GB); Simone Malaguti, Warwick (GB); Ian Whelan, Warwick (GB); Davide Carpentiero, Warwick (GB); Mattia Lugli, Warwick (GB); Luke Scott, Warwick (GB)

(73) Assignee: ASTON MARTIN LAGONDA LIMITED, Gaydon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,032

(22) Filed: Apr. 26, 2024

(65) Prior Publication Data

US 2024/0271559 A1    Aug. 15, 2024

Related U.S. Application Data

(63) Continuation of application No. 17/414,252, filed as application No. PCT/EP2019/085610 on Dec. 17, 2019, now Pat. No. 12,000,329.

(30) Foreign Application Priority Data

Dec. 17, 2018   (GB) ...................... 1820560

(51) Int. Cl.
*F02B 19/00*    (2006.01)
*F02B 19/10*    (2006.01)
(Continued)

(52) U.S. Cl.
CPC .......... *F02B 19/1061* (2013.01); *F02B 19/12* (2013.01); *F02B 19/16* (2013.01)

(58) Field of Classification Search
CPC ...... F02B 19/1061; F02B 19/12; F02B 19/16; Y02T 10/12
See application file for complete search history.

(56) References Cited

U.S. PATENT DOCUMENTS

| | | | |
|---|---|---|---|
| 958,844 A | 5/1910 | Vierengel et al. |
| 2,253,805 A | 8/1941 | Olivier |

(Continued)

FOREIGN PATENT DOCUMENTS

| | | |
|---|---|---|
| CA | 1102066 A | 6/1981 |
| CN | 2532249 Y | 1/2003 |

(Continued)

OTHER PUBLICATIONS

Dictionary.com; http://dictionary.reference.com/browse/engine (7 pages).

(Continued)

*Primary Examiner* — Phutthiwat Wongwian
*Assistant Examiner* — Sherman D Manley
(74) *Attorney, Agent, or Firm* — Dorsey & Whitney LLP

(57) ABSTRACT

The present disclosure relates to assemblies for engines such as pre-combustion chamber assemblies for spark ignition engines. In one example, a pre-combustion chamber assembly includes an ignition chamber adapted to contain at least one electrode of a spark generator. The ignition chamber being adapted to communicate with a main engine combustion chamber via a plurality of pre-chamber ports. The ignition chamber communicates for removal therefrom of exhaust gas residuals to a distinct storage chamber via at least one transfer port. The ignition chamber includes a single substantially cylindrical entrance channel leading from said pre-chamber ports in a direction towards an ignition region of the ignition chamber. The ignition region having a larger cross-section than the entrance channel.

23 Claims, 16 Drawing Sheets

(51) Int. Cl.
*F02B 19/12* (2006.01)
*F02B 19/16* (2006.01)

(56) References Cited

U.S. PATENT DOCUMENTS

| | | | |
|---|---|---|---|
| 2,405,598 A | 8/1946 | Miller | |
| 2,443,875 A | 6/1948 | Spangenberger | |
| 2,863,658 A | 12/1958 | James | |
| 2,955,817 A | 10/1960 | Campbell et al. | |
| 3,273,285 A | 9/1966 | Champion | |
| 3,500,589 A | 3/1970 | Ellege | |
| 3,561,795 A | 2/1971 | Becher | |
| 3,670,454 A | 6/1972 | Gebhard et al. | |
| 3,721,069 A | 3/1973 | Walker | |
| 3,730,634 A | 5/1973 | Gerber et al. | |
| 3,733,748 A | 5/1973 | Heesch | |
| 3,788,005 A | 1/1974 | Mistopoulos | |
| 3,816,963 A | 6/1974 | Hartmeyer et al. | |
| 3,848,886 A | 11/1974 | Feustel et al. | |
| 3,899,047 A | 8/1975 | Maeda et al. | |
| 3,912,295 A | 10/1975 | Eggert | |
| 3,937,641 A | 2/1976 | Kushner et al. | |
| 4,051,286 A | 9/1977 | Abbott | |
| 4,127,095 A * | 11/1978 | Noguchi | F02B 19/12 |
| | | | 123/430 |
| 4,262,452 A | 4/1981 | Lopez | |
| 4,426,101 A | 1/1984 | Dyer | |
| 4,437,373 A | 3/1984 | Van | |
| 4,452,189 A * | 6/1984 | Latsch | F02B 19/12 |
| | | | 123/250 |
| 4,471,677 A | 9/1984 | Lissot et al. | |
| 4,502,248 A | 3/1985 | Thomas et al. | |
| 4,571,884 A | 2/1986 | Hetmann et al. | |
| 4,573,734 A | 3/1986 | Gass | |
| 4,594,292 A | 6/1986 | Nagai et al. | |
| 4,630,959 A | 12/1986 | Glaser | |
| 4,653,968 A | 3/1987 | Rapata et al. | |
| 4,660,345 A | 4/1987 | Browning | |
| 4,729,592 A | 3/1988 | Tuchiya et al. | |
| 4,760,669 A | 8/1988 | Maccaferri et al. | |
| 4,761,916 A | 8/1988 | Sanok et al. | |
| 4,768,493 A | 9/1988 | Ohtaka et al. | |
| 4,776,630 A | 10/1988 | Fukutomi et al. | |
| 4,796,943 A | 1/1989 | Fukutomi et al. | |
| 4,811,517 A | 3/1989 | Eckert et al. | |
| 4,825,596 A | 5/1989 | Kinner | |
| 4,828,317 A | 5/1989 | Muscat | |
| 4,842,327 A | 6/1989 | Hennessy | |
| 4,844,032 A | 7/1989 | Groeger et al. | |
| 4,847,024 A | 7/1989 | Loren | |
| 4,917,203 A | 4/1990 | Sacco et al. | |
| 4,924,057 A | 5/1990 | Puddle et al. | |
| 4,944,540 A | 7/1990 | Mansoor et al. | |
| 4,957,517 A | 9/1990 | Linnert | |
| 5,022,685 A | 6/1991 | Stiskin et al. | |
| 5,036,943 A | 8/1991 | Kashiwagi | |
| 5,056,266 A | 10/1991 | Norris et al. | |
| 5,172,954 A | 12/1992 | Yamazaki et al. | |
| 5,201,566 A | 4/1993 | Mori | |
| 5,228,259 A | 7/1993 | Haddad et al. | |
| 5,244,248 A | 9/1993 | Bovellan | |
| 5,248,897 A | 9/1993 | Lee | |
| 5,273,606 A | 12/1993 | Greve et al. | |
| 5,332,462 A | 7/1994 | Myers | |
| 5,358,300 A | 10/1994 | Gray | |
| 5,362,120 A | 11/1994 | Cornille, Jr. | |
| 5,372,216 A | 12/1994 | Tsuji et al. | |
| 5,374,081 A | 12/1994 | Schoderer et al. | |
| 5,403,048 A | 4/1995 | Ekladyous et al. | |
| 5,404,730 A | 4/1995 | Westermeyer | |
| 5,456,516 A | 10/1995 | Alexander et al. | |
| 5,472,373 A | 12/1995 | Wolters | |
| 5,478,127 A | 12/1995 | Chase | |
| 5,479,907 A | 1/1996 | Walker | |
| 5,482,336 A | 1/1996 | Rouse et al. | |
| 5,503,444 A | 4/1996 | Rouse et al. | |
| 5,531,455 A | 7/1996 | Calixto | |
| 5,542,664 A | 8/1996 | Mahaffey et al. | |
| 5,556,498 A | 9/1996 | Blanchard | |
| 5,574,315 A | 11/1996 | Weber | |
| 5,593,202 A | 1/1997 | Corder et al. | |
| 5,609,004 A | 3/1997 | Kreis | |
| 5,670,108 A | 9/1997 | Kem et al. | |
| 5,670,109 A | 9/1997 | DeRees | |
| 5,678,517 A * | 10/1997 | Chen | F02B 19/1009 |
| | | | 123/263 |
| 5,685,596 A | 11/1997 | Tokarz et al. | |
| 5,686,144 A | 11/1997 | Thebault et al. | |
| 5,738,747 A | 4/1998 | Blanchard | |
| 5,830,308 A | 11/1998 | Reichard | |
| 5,865,500 A | 2/1999 | Sanada et al. | |
| 5,880,394 A | 3/1999 | Kim | |
| 5,882,064 A | 3/1999 | Emmons | |
| 5,915,494 A | 6/1999 | Matsumura et al. | |
| 5,915,781 A | 6/1999 | DeRees | |
| 5,975,231 A | 11/1999 | Hirato | |
| 6,059,483 A | 5/2000 | Owens et al. | |
| 6,071,180 A | 6/2000 | Becker | |
| 6,099,387 A | 8/2000 | Gilmer et al. | |
| D431,505 S | 10/2000 | Akana et al. | |
| 6,193,273 B1 | 2/2001 | Novak et al. | |
| 6,193,274 B1 | 2/2001 | Brown et al. | |
| 6,206,438 B1 | 3/2001 | Pueyo | |
| 6,223,637 B1 | 5/2001 | Hansen | |
| 6,269,902 B1 | 8/2001 | Miyagawa | |
| 6,364,397 B1 | 4/2002 | Bordeaux et al. | |
| 6,405,819 B1 | 6/2002 | Ohkura et al. | |
| 6,461,136 B1 | 10/2002 | Gruber et al. | |
| 6,527,533 B2 | 3/2003 | Dahl et al. | |
| 6,588,970 B1 | 7/2003 | Natrop | |
| 6,695,392 B2 | 2/2004 | Stoffels et al. | |
| 6,702,343 B1 | 3/2004 | Stull | |
| 6,702,507 B2 | 3/2004 | Wild | |
| 6,725,849 B2 | 4/2004 | Stegmaier et al. | |
| 6,748,308 B2 | 6/2004 | Losey | |
| 6,803,733 B1 | 10/2004 | Shabana et al. | |
| 6,805,213 B2 | 10/2004 | Seffernick et al. | |
| 6,805,389 B1 | 10/2004 | Schellenberg | |
| 6,899,195 B2 | 5/2005 | Miyasaka | |
| 6,957,846 B2 | 10/2005 | Saeki | |
| 7,037,024 B2 | 5/2006 | Steinwender | |
| 7,100,973 B2 | 9/2006 | Aigner et al. | |
| 7,152,915 B2 | 12/2006 | Diehl et al. | |
| 7,163,076 B2 | 1/2007 | Seksaria et al. | |
| 7,210,733 B2 | 5/2007 | Mouch et al. | |
| 7,213,873 B2 | 5/2007 | Murata et al. | |
| 7,246,612 B2 | 7/2007 | Shieh et al. | |
| 7,246,676 B2 | 7/2007 | Cantu | |
| 7,287,789 B2 | 10/2007 | Woods et al. | |
| 7,362,068 B2 | 4/2008 | Yamamoto | |
| 7,393,388 B2 | 7/2008 | Spadaccini et al. | |
| 7,407,192 B2 | 8/2008 | Yoshimura | |
| 7,416,241 B2 | 8/2008 | Wallman et al. | |
| 7,424,353 B2 | 9/2008 | Engelhardt et al. | |
| 7,445,653 B2 | 11/2008 | Trautmann et al. | |
| 7,464,984 B1 | 12/2008 | McDaniel | |
| 7,537,253 B2 | 5/2009 | Rosen et al. | |
| 7,559,402 B2 | 7/2009 | Jennings et al. | |
| 7,575,273 B2 | 8/2009 | Wallman et al. | |
| 7,625,618 B1 | 12/2009 | Allen et al. | |
| 7,631,928 B2 | 12/2009 | Ackland et al. | |
| 7,645,406 B2 | 1/2010 | Kilwin et al. | |
| 7,670,527 B2 | 3/2010 | Malis | |
| 7,681,685 B2 | 3/2010 | Herzog et al. | |
| 7,686,384 B2 | 3/2010 | Paul et al. | |
| 7,690,722 B2 | 4/2010 | Boggess | |
| 7,766,112 B2 | 8/2010 | Kapadia et al. | |
| 7,861,460 B1 | 1/2011 | Costello et al. | |
| 8,002,072 B2 | 8/2011 | Schmahl | |
| 8,047,186 B2 | 11/2011 | Shieh et al. | |
| 8,124,219 B2 | 2/2012 | Miyachi et al. | |
| 8,151,434 B2 | 4/2012 | Fukao | |
| 8,196,996 B1 | 6/2012 | Campbell | |
| 8,291,645 B2 | 10/2012 | Höhn et al. | |

(56) References Cited

U.S. PATENT DOCUMENTS

| | | | |
|---|---|---|---|
| 8,584,648 B2* | 11/2013 | Chiera | H01T 21/02 |
| | | | 123/266 |
| 8,839,762 B1* | 9/2014 | Chiera | F02B 19/12 |
| | | | 123/266 |
| 9,662,967 B2 | 5/2017 | Rutschmann et al. | |
| 9,840,963 B2* | 12/2017 | Chiera | F02B 19/12 |
| 10,040,491 B2 | 8/2018 | Brooks et al. | |
| 10,125,665 B2* | 11/2018 | Sotiropoulou | F02B 19/18 |
| 11,156,148 B1* | 10/2021 | Engineer | F02B 19/12 |
| 2001/0014250 A1 | 8/2001 | Plummer et al. | |
| 2001/0025407 A1 | 10/2001 | Hartmann et al. | |
| 2002/0016121 A1 | 2/2002 | Bjekovic et al. | |
| 2002/0088321 A1 | 7/2002 | Boscolo | |
| 2002/0089214 A1 | 7/2002 | Gloss | |
| 2002/0108310 A1 | 8/2002 | Schroer | |
| 2002/0152013 A1 | 10/2002 | Knab et al. | |
| 2003/0071446 A1 | 4/2003 | Haderer et al. | |
| 2003/0089545 A1 | 5/2003 | Seksaria et al. | |
| 2003/0090127 A1 | 5/2003 | Saeki | |
| 2003/0178834 A1 | 9/2003 | Grimm et al. | |
| 2004/0079478 A1 | 4/2004 | Merz | |
| 2004/0095084 A1 | 5/2004 | Mersch | |
| 2004/0182213 A1 | 9/2004 | Wagner et al. | |
| 2004/0209087 A1 | 10/2004 | Ash | |
| 2005/0006928 A1 | 1/2005 | Diehl et al. | |
| 2005/0061573 A1 | 3/2005 | Mizuno et al. | |
| 2005/0082782 A1 | 4/2005 | Jolley | |
| 2005/0093341 A1 | 5/2005 | Aigner et al. | |
| 2005/0155696 A1 | 7/2005 | Ash | |
| 2006/0011026 A1 | 1/2006 | Dickey | |
| 2006/0097502 A1 | 5/2006 | Bingham et al. | |
| 2006/0172111 A1 | 8/2006 | Polus et al. | |
| 2006/0207080 A1 | 9/2006 | Keate | |
| 2006/0261452 A1 | 11/2006 | Berchtold et al. | |
| 2006/0293821 A1 | 12/2006 | Takahashi | |
| 2007/0051465 A1 | 3/2007 | Naughton et al. | |
| 2007/0199651 A1 | 8/2007 | Woelfel et al. | |
| 2007/0236047 A1 | 10/2007 | Wallman et al. | |
| 2007/0270029 A1 | 11/2007 | Schroder et al. | |
| 2008/0072755 A1 | 3/2008 | Dooley | |
| 2008/0122213 A1 | 5/2008 | Xu et al. | |
| 2008/0179853 A1 | 7/2008 | Kuwabara et al. | |
| 2008/0197672 A1 | 8/2008 | Yamaguchi et al. | |
| 2008/0223347 A1 | 9/2008 | Hommes et al. | |
| 2008/0290692 A1 | 11/2008 | Boggess | |
| 2008/0302591 A1 | 12/2008 | Herzog et al. | |
| 2008/0305362 A1 | 12/2008 | Schroeder et al. | |
| 2009/0000441 A1 | 1/2009 | Hasebe et al. | |
| 2009/0004477 A1 | 1/2009 | Malle et al. | |
| 2009/0058340 A1 | 3/2009 | Sakai et al. | |
| 2009/0102239 A1 | 4/2009 | Iwai et al. | |
| 2009/0120704 A1 | 5/2009 | Thomas et al. | |
| 2009/0315311 A1 | 12/2009 | Tamakoshi | |
| 2010/0050553 A1 | 3/2010 | Schofield | |
| 2010/0065688 A1 | 3/2010 | Wood | |
| 2010/0074678 A1 | 3/2010 | Jaranson et al. | |
| 2010/0095624 A1 | 4/2010 | Lewis et al. | |
| 2010/0156138 A1 | 6/2010 | Terai et al. | |
| 2010/0201159 A1 | 8/2010 | Chretien et al. | |
| 2010/0236708 A1 | 9/2010 | Merz | |
| 2010/0332086 A1 | 12/2010 | Zhao | |
| 2012/0037465 A1 | 2/2012 | Abe et al. | |
| 2012/0125279 A1* | 5/2012 | Hampson | H01T 21/02 |
| | | | 445/7 |
| 2012/0125287 A1* | 5/2012 | Chiera | F02P 15/001 |
| | | | 123/266 |
| 2012/0136532 A1 | 5/2012 | Konchan | |
| 2012/0217761 A1 | 8/2012 | Nakamura et al. | |
| 2013/0055642 A1 | 3/2013 | Patterson | |
| 2013/0181484 A1 | 7/2013 | Grattan | |
| 2014/0083391 A1* | 3/2014 | Gruber | F02B 19/1095 |
| | | | 123/260 |
| 2014/0102404 A1* | 4/2014 | Sotiropoulou | F02B 19/08 |
| | | | 123/274 |
| 2014/0165350 A1 | 6/2014 | O'Neil | |
| 2014/0261296 A1* | 9/2014 | Sotiropoulou | F02B 19/1014 |
| | | | 123/260 |
| 2015/0040845 A1* | 2/2015 | Chiera | F02P 13/00 |
| | | | 123/445 |
| 2016/0010538 A1* | 1/2016 | Suzuki | F02D 19/024 |
| | | | 123/292 |
| 2016/0053670 A1 | 2/2016 | Tozzi et al. | |
| 2016/0053673 A1* | 2/2016 | Sotiropoulou | F02B 19/12 |
| | | | 123/260 |
| 2016/0251041 A1 | 9/2016 | Wolf et al. | |
| 2017/0225623 A1 | 8/2017 | Gaylard et al. | |
| 2017/0240221 A1 | 8/2017 | Gaylard et al. | |
| 2017/0240222 A1 | 8/2017 | Gaylard et al. | |
| 2017/0240223 A1 | 8/2017 | Gaylard et al. | |
| 2017/0240224 A1 | 8/2017 | Gaylard et al. | |
| 2017/0240226 A1 | 8/2017 | Brooks et al. | |
| 2020/0080466 A1* | 3/2020 | Anderson | F02B 19/12 |

FOREIGN PATENT DOCUMENTS

| | | |
|---|---|---|
| CN | 200949316 Y | 9/2007 |
| CN | 101660638 A | 3/2010 |
| CN | 201784702 U | 4/2011 |
| CN | 103068756 A | 4/2013 |
| CN | 103682511 A | 3/2014 |
| DE | 2204955 A1 | 8/1973 |
| DE | 2727517 A1 | 12/1978 |
| DE | 3037255 A1 | 4/1982 |
| DE | 3325906 A1 | 1/1985 |
| DE | 3428610 A1 | 2/1986 |
| DE | 3512117 A1 | 10/1986 |
| DE | 3614106 A1 | 10/1987 |
| DE | 3635924 A1 | 5/1988 |
| DE | 3811427 A1 | 10/1989 |
| DE | 4022137 C1 | 1/1992 |
| DE | 4204826 A1 | 6/1993 |
| DE | 4321969 A1 | 2/1994 |
| DE | 4343680 C1 | 5/1995 |
| DE | 4417110 A1 | 11/1995 |
| DE | 19530262 A1 | 2/1996 |
| DE | 19502794 A1 | 8/1996 |
| DE | 19541129 C1 | 2/1997 |
| DE | 19709602 A1 | 9/1998 |
| DE | 10063582 A1 | 6/2002 |
| DE | 20314107 U1 | 1/2004 |
| DE | 10336483 A1 | 3/2005 |
| DE | 10341982 A1 | 4/2005 |
| DE | 102005023399 A1 | 12/2005 |
| DE | 102005017186 A1 | 10/2006 |
| DE | 102007031409 A1 | 1/2009 |
| DE | 102008060930 A1 | 4/2010 |
| DE | 202018100173 U1 | 1/2018 |
| DE | 102019131480 A1 | 12/2020 |
| EP | 0006764 A1 | 1/1980 |
| EP | 0363744 A2 | 4/1990 |
| EP | 0467523 A2 | 1/1992 |
| EP | 0502237 A1 | 9/1992 |
| EP | 0656838 B1 | 1/1995 |
| EP | 0648593 A2 | 4/1995 |
| EP | 0887217 A2 | 12/1998 |
| EP | 0896892 A1 | 2/1999 |
| EP | 0900637 A2 | 3/1999 |
| EP | 0906863 A2 | 7/1999 |
| EP | 0931641 A2 | 7/1999 |
| EP | 0994005 A2 | 4/2000 |
| EP | 1048556 A1 | 11/2000 |
| EP | 1065390 A2 | 1/2001 |
| EP | 1088997 A1 | 4/2001 |
| EP | 1205366 A1 | 5/2002 |
| EP | 1211114 A2 | 6/2002 |
| EP | 1216870 A2 | 6/2002 |
| EP | 1232886 A1 | 8/2002 |
| EP | 1361099 A2 | 11/2003 |
| EP | 1422046 A1 | 5/2004 |
| EP | 1508508 A1 | 2/2005 |
| EP | 1541747 A1 | 6/2005 |
| EP | 1624477 A2 | 2/2006 |

(56) References Cited

FOREIGN PATENT DOCUMENTS

| | | | |
|---|---|---|---|
| EP | 1690906 | A1 | 8/2006 |
| EP | 1506911 | B1 | 10/2007 |
| EP | 2085210 | A2 | 8/2009 |
| EP | 1907267 | B1 | 9/2009 |
| EP | 2106976 | A1 | 10/2009 |
| EP | 2107633 | A1 | 10/2009 |
| EP | 2415575 | A1 | 2/2012 |
| EP | 3322015 | A1 | 5/2018 |
| EP | 3477764 | A1 | 5/2019 |
| FR | 2028926 | A1 | 10/1970 |
| FR | 2885343 | A1 | 11/2006 |
| FR | 2887211 | A1 | 12/2006 |
| FR | 3061743 | A1 | 7/2018 |
| GB | 659056 | A | 10/1951 |
| GB | 955388 | A | 4/1964 |
| GB | 1085723 | A | 10/1967 |
| GB | 1311934 | A | 3/1973 |
| GB | 1418255 | A | 12/1975 |
| GB | 2025525 | A | 1/1980 |
| GB | 2133461 | A | 7/1984 |
| GB | 2327912 | A | 2/1999 |
| GB | 2341420 | A | 3/2000 |
| GB | 2344085 | A | 5/2000 |
| GB | 2379481 | A | 3/2003 |
| GB | 2406152 | A | 3/2005 |
| GB | 2416145 | A | 1/2006 |
| GB | 2445361 | A | 7/2008 |
| GB | 2445929 | A | 7/2008 |
| GB | 2512889 | A | 10/2014 |
| JP | S554212 | A | 1/1980 |
| JP | 56-31846 | A | 3/1981 |
| JP | S62183317 | A | 8/1987 |
| JP | 63-28611 | A | 2/1988 |
| JP | H0415123 | A | 1/1992 |
| JP | H09123198 | A | 5/1997 |
| JP | H09169212 | A | 6/1997 |
| JP | 11-34935 | A | 2/1999 |
| JP | 2890353 | B2 | 2/1999 |
| JP | 2002240738 | A | 8/2002 |
| JP | 2004150271 | A | 5/2004 |
| JP | 2007203806 | | 8/2007 |
| JP | 2007245589 | A | 9/2007 |
| JP | 2010000881 | A | 1/2010 |
| JP | 2010037444 | A | 2/2010 |
| KR | 20020049355 | A | 6/2002 |
| TW | 275476 | B | 3/2007 |
| WO | 91/04900 | A1 | 4/1991 |
| WO | 9527589 | A1 | 10/1995 |
| WO | 02072676 | A2 | 9/2002 |
| WO | 2002087872 | A1 | 11/2002 |
| WO | 2003024747 | A1 | 3/2003 |
| WO | 03048531 | A1 | 6/2003 |
| WO | 03/076539 | A1 | 9/2003 |
| WO | 03093656 | A1 | 11/2003 |
| WO | 03095163 | A1 | 11/2003 |
| WO | 2006108111 | A2 | 10/2006 |
| WO | 2008038429 | A1 | 4/2008 |
| WO | 2008062143 | A2 | 5/2008 |
| WO | 2008134369 | A1 | 11/2008 |
| WO | 2010003842 | A1 | 1/2010 |
| WO | 2010063413 | A1 | 6/2010 |
| WO | 2010086518 | A1 | 8/2010 |
| WO | 2010105708 | A1 | 9/2010 |
| WO | 2010127884 | A2 | 11/2010 |
| WO | 2011104853 | A1 | 9/2011 |
| WO | 2013186130 | A1 | 12/2013 |
| WO | 2014111243 | A2 | 7/2014 |
| WO | 2014167339 | A1 | 10/2014 |
| WO | 2018213264 | A2 | 11/2018 |
| WO | 2020016138 | A1 | 1/2020 |

OTHER PUBLICATIONS

Dictionary.com; http://dictionary.reference.com/browse/overflow (6 pages).
Dictionary.com; http://dictionary.reference.com/browse/refrigerant (4 pages).
Extended European Search Report for EP Patent Application No. 05270085.3, dated May 7, 2008 (4 pages).
GB Search Report dated Mar. 27, 2009, GB 0820267.3 (2 pages).
International Search Report and Written Opinion dated Apr. 8, 2010, PCT/GB2009/002607 (10 pages).
International Search Report and Written Opinion dated Feb. 7, 2011, PCT/GB2010/001616 (19 pages).
International Search Report and Written Opinion dated Nov. 30, 2010, PCT/GB2010/001018 (11 pages).
International Search Report and Written Opinion mailed Apr. 4, 2022 received in PCT International Application No. PCT/EP2022/052311.
International Search Report dated Feb. 28, 2008, PCT/GB2007/004244 (5 pages).
International Search Report for PCT Application No. PCT/EP2019/085610, mailed Apr. 20, 2020 (2 pages).
Office Action (Restriction Requirement), U.S. Appl. No. 10/922,698, mailed Jan. 18, 2007 (5 pages).
Office Action, U.S. Appl. No. 10/922,698, mailed Mar. 14, 2007 (7 pages).
PCT International Preliminary Examination Report, Date of report Dec. 5, 2002, Authorized officer Petersson, M. for International application No. PCT/GB01/03563 (11 pages).
PCT International Search Report (International Application No. PCT/GB01/03563) International Filing Date Aug. 8, 2001 (Earliest) Priority Date Aug. 8, 2000 (3 pages).
PCT International Search Report and Written Opinion for PCT Application No. PCT/GB2013/051661, mailed Sep. 5, 2013 (8 pages).
PCT International Search Report and Written Opinion for PCT Application No. PCT/GB2013/052054, dated Feb. 18, 2014 (17 pages).
PCT Written Opinion (PCT Rule 66) mailed Aug. 21, 2002 from the International Preliminary Examining Authority for International Application No. PCT/GB01/03563 (5 pages).
PCT Written Opinion from the International Preliminary Examining Authority Mailed Jun. 3, 2002 for International Application No. PCT/GB01/03563 (2 pages).
Response to Restriction Requirement, U.S. Appl. No. 10/922,698, filed Feb. 16, 2007 (1page).
Search Report dated Nov. 1, 2021 received in GB Application No. GB2101388.3.
Search Report dated Dec. 8, 2009, GB 0914921.2 (4 pages).
Search Report dated Mar. 6, 2007, GB 0622163.4 (1 page).
Search Report for United Kingdom Application No. GB1100653.3, dated Apr. 18, 2011 (1 page).
United Kingdom Search Report dated Aug. 28, 2009, GB 0908721.4 (3 pages).
GB Search Report for GB1610107.3, dated Feb. 22, 2017, 10 pages.
GB1206260.0—GB Search Report dated Jul. 25, 2012.
International Search Report and Written Opinion for PCT/GB2017/051695, dated Jan. 3, 2018, 18 pages.
WO2013150311—International Search Report dated Nov. 11, 2013, 7 pgs.
EPO Extended European Search Report, European Search Report for Application No. EP 12151134, Apr. 4, 2013, 8 pages.
British Search Report dated Jun. 19, 2014, British Patent Application No. GB1320960.6, Jun. 19, 2014, 4 Pages.
International Search Report and Written Opinion Dated Sep. 29, 2015, International Application No. PCT/GB2014/053513, Sep. 29, 2015,10 Pages.

(56) References Cited

OTHER PUBLICATIONS

Mustafa, A. Ahmetoglu, Manufacturing of Structural Automotive Components from Extruded Aluminum Profiles, SAE Technical Paper Series, Oct. 3-5, 2000, 2000-01-2712, Detroit, Michigan (8 pages).
34 International Search Report for PCT/GB2014/053513, Sep. 29, 2015, 10 Pages.

* cited by examiner

ASSEMBLIES FOR ENGINES

CROSS-REFERENCE TO RELATED APPLICATIONS

This application is a continuation of U.S. patent application Ser. No. 17/414,252, filed 15 Jun. 2021, which is a national stage application under 35 U.S.C. § 371 of International Application No. PCT/EP2019/085610 filed 17 Dec. 2019 entitled "Assemblies for Engines," which claims priority to Great Britain Patent Application No. 1820560.9 filed 17 Dec. 2018. The contents of each of these applications are hereby incorporated by reference herein in their entireties and for all purposes.

The present invention relates to assemblies for engines such as pre-combustion chamber assemblies for spark ignition engines.

It is known to provide a spark ignition engine with a pre-combustion chamber but it can be difficult to provide a system with good knock performance at high speed with high loads while still having reliable ignition at low speed with low load. In particular, at low speed with low load, there may be a relatively high percentage of exhaust gas residuals (EGR) in a pre-combustion chamber which can prevent ignition especially when the ignition timing is retarded during catalyst heating.

The present invention aims to alleviate at least to a certain extent the problems of the prior art.

According to a first aspect of the present invention there is provided a pre-combustion chamber assembly for a spark ignition engine, the assembly having: an ignition chamber adapted to contain at least one electrode of a spark generator; the ignition chamber being adapted to communicate with a main engine combustion chamber via at least one pre-chamber port; wherein the ignition chamber communicates for removal therefrom of exhaust gas residuals. The exhaust gas residuals are preferably removed to a distinct storage chamber, more preferably via a transfer port.

Advantageously, in the case of a four-stroke reciprocating piston internal combustion engine which may be a gasoline engine, the exhaust gas residuals can, for example during the compression stroke, be purged or substantially purged from the ignition chamber into the storage chamber. This advantageously lowers the percentage of exhaust gas residuals in the ignition chamber at the moment of ignition for the following power stroke. Thus, advantageously, ignition can be maintained at low speed with low load, including at idle and test points such as 2000×2 (2000 RPM at 2 bar BMEP), while also allowing catalyst heating at retarded ignition timing. At the same time, at wide open throttle, the use of the pre-combustion chamber assembly can allow an improvement of knock limit compared to a conventional system without a pre-combustion chamber.

The ignition chamber may include an entrance channel which leads from each said pre-chamber port in a direction towards an ignition region of the ignition chamber, the ignition region preferably having a larger cross-section than the entrance channel. The ignition region may contain at least one or at least two electrodes of a spark generator such as a spark plug and the relatively smaller cross-sectioned entrance channel may enable a relatively high speed flow towards the ignition region during purging action of the ignition region into the storage chamber.

The entrance channel may be substantially a circular cylinder and the ignition region may also be substantially a circular cylinder. The entrance channel and ignition region may be coaxial with each other (or off-centre relative to one another) and joined by a flaring chamber-connecting wall. The ignition region may have a diameter between about 2 and 5 times that of the entrance channel.

The ignition chamber may include a step surface adapted to promote flow tumble, or another tumble feature. This may advantageously promote turbulence within the ignition chamber, promoting a high percentage of the exhaust gas residuals in the ignition chamber to be purged out into the storage chamber. The step surface may be located in the region of the flaring chamber wall.

The step surface may be aligned radially with a ground terminal of the spark generator, just a J-shaped ground terminal. This advantageously directs turbulent flow towards the electrodes of the spark generator in order to improve ignition.

The ignition chamber may have a longitudinal direction and may be adapted to connect at one end thereof to a substantially coaxially oriented spark generator in the form of a spark plug.

The ignition chamber may be adapted to contain a tip of a ground electrode of a spark plug substantially in the centre radially and/or longitudinally of the ignition region, preferably both.

At least one wall, or wall features, of the ignition chamber near where a spark generator is to be contained may be formed of a high conductivity material such as one having a conductivity of over 100 W/mK, this high heat conductivity advantageously allowing the spark generator or spark plug to be kept cool. The conductivity may be in the region of 120 to 170 W/mK. The material may contain copper and/or beryllium and may be $CuBe_2$ or $CuBe_3$. Other materials may be used instead.

A wall surface, or wall features, of the ignition chamber distal from where a spark generator is to be contained may be a steel, such as 316 stainless steel, alternatively, the material of such wall features may have a relatively low heat conductivity under about 50 or 15 W/mK. Other materials may be used instead.

A series of said pre-chamber ports may be provided, preferably configured in an equispaced pattern. For example, four, five, six, seven or eight pre-chamber ports may be provided in a generally equispaced pattern. The pre-chamber ports may be oriented in a pattern in which they diverge from one another in a direction away from the ignition chamber. The pre-chamber ports may be straight cylindrical tubes, each oriented at an angle diverging from a longitudinal direction or axis of the ignition chamber of about 30 to 60°, some examples being about 35, 40, 45, 50 and 55°. The diverging straight cylindrical tubes may highly advantageously, at the time of ignition, jet ignited gases and/or flame fronts out from the ignition chamber in a diverging pattern into the main combustion chamber, promoting excellent flame front propagation speed. When there are six said pre-chamber ports, the diameter of the entrance channel may be about 2 to 4 times the diameter of each pre-chamber port. The relatively small diameters of the pre-chamber ports allows acceleration of ignited gases as they pass out of the entrance channel into the pre-chamber ports, such that the velocity of the gases exiting the pre-chamber ports into the main combustion chamber is relatively high, enabling advantageous flame front speed. The length of the pre-chamber ports may be about 2 to 4 times their diameter, advantageously providing good acceleration into the main combustion chamber without quenching the flames in the transfer ports.

Each pre-chamber port may interface with a surface of the main combustion chamber which is substantially flat or convexly domed. A convexly domed surface may have certain advantages in flame propagation, for example, although a substantially flat surface may have a lower surface area, advantageous for lower heat transfer.

The storage chamber may be adapted to communicate only with the ignition chamber, otherwise being fully sealed. The storage chamber may therefore act as a purge chamber to accept gases purged out of the ignition chamber, for example in a compression stroke of a four-stroke cycle, and the gases purged into the storage chamber may be flushed or scavenged out of the storage chamber at least partly upon exhaust valve opening for the exhaust stroke and/or at least partly during another stroke of a four-stroke cycle such as a relatively low pressure induction stroke. Use of the pre-combustion chamber assembly for two-stroke cycles is also envisaged.

The storage chamber may be adapted to accept transfer or purge of gas from the ignition chamber upon a rise in pressure in the ignition chamber, for example during a compression stroke of a 4-stroke cycle or a compression phase of a 2-stroke.

The storage chamber may be adapted to accept transfer of gas, including exhaust gas residuals (EGR), from the ignition chamber during an engine compression stroke.

The storage chamber may be formed in a toroidal ring shape. The toroidal ring shape may have a generally L-shaped cross-section. Other cross-sectional shapes are envisaged, such as I, J, T, rectangular, circular, elliptical and generally rectangular or generally polygonal. The toroidal ring shape may be located around the ignition chamber. Advantageously, therefore, the storage chamber may be located relatively close to the ignition chamber, for example within a cylinder head package space, such that the pre-combustion chamber assembly does not take up significant packaging space in an engine compartment. The L-shaped cross-section is simple/cheap to machine and the storage chamber is robustly formed in the head casting.

With the ignition chamber and toroidal ring-shaped storage chamber communicating via the one or more transfer ports, it is not necessary to provide valving to control the flow from the ignition chamber out into the storage chamber or from the storage chamber back into the ignition chamber. Thus, the pre-combustion chamber need have no moving parts. The pre-combustion chamber assembly can therefore be operated very reliably without the risk of mechanical moving part failure.

The toroidal ring shape may be located around the ignition chamber. The ignition chamber may have a larger volume than the storage chamber, such as about 2 to 10 times larger, e.g. about 4 to 6 times larger. In one example, the volume of the ignition chamber is about 1000 $mm^3$ and the volume of the storage chamber is about 200 to 250 $mm^3$. With the pre-combustion chamber assembly used in a gasoline engine with octane at about 90 to 99 RON, the engine may have a compression ratio in the range of about 8:1 to 12:1 or higher, for example about 10:1 to 11:1. The volume of the ignition chamber may optionally be about 1% to 2% of the volume at piston top dead centre of a main combustion chamber of the engine to which the ignition chamber is connected.

The ratio of the volume of the ignition chamber to the storage chamber may therefore enable gases left in the ignition chamber after the exhaust stroke and induction stroke, including exhaust gas residuals, to be substantially purged out into the storage chamber by increasing pressure during the compression stroke. Thus, during the compression stroke, gases may flow along a flow path from the main combustion chamber in through the pre-chamber ports through the entrance channel into the ignition chamber and then from the ignition chamber through the transfer ports into the storage chamber, the ignition chamber being substantially purged into the storage chamber during the compression stroke. An analogy of sorts can be thought of with a system with three springs: equivalent to main combustion chamber, ignition chamber and storage chamber.

When a tumble feature such as a tumble step is present, preferably substantially radially aligned with a ground electrode, e.g. a J-shaped electrode of a spark generator located in the ignition chamber, the extra turbulence provided by the tumble feature may assist in encouraging reliable ignition.

The storage chamber may advantageously be designed and adapted to be located within a cylinder head assembly for an engine. The pre-combustion chamber may therefore be substantially enclosed in the cylinder head/block of the engine, advantageously for packaging space and easy manufacturing and robustness.

Preferably, a series of said transfer ports are provided communicating at spaced apart locations into the ignition chamber from the storage chamber; at least one said transfer port optionally communicating into the ignition chamber at a first longitudinal position of the ignition chamber, at least one and preferably two electrode tips of a spark generator being longitudinally between the first longitudinal location and a pre-chamber port. The spaced locations may be generally equispaced around the ignition chamber. However, when a tumble step is provided the transfer ports may be spaced somewhat further apart from one another (such as about 90 degrees apart) near the tumble step than they are (such as about 70 degrees part) radially remote from the tumble step.

Each said transfer port may be a substantially straight tube or curved. Each said transfer port may have a cross-dimension or diameter which is between 5% and 20%, e.g. about 8 to 12% or 10%, of a cross-dimension of a diameter of an ignition region of the ignition chamber. Thus, when gases are purged out of the ignition chamber they may accelerate to relatively high speed in each transfer port, thereby arriving at high speed in the storage chamber, promoting the movement of gases within the storage chamber already and therefore assisting in scavenging/purge of gaseous molecules in the storage chamber back out of it over time.

Each transfer port may be arranged in a direction which is a substantially radial direction, or having a tangential component, when viewed along a longitudinal direction of the assembly. When a tangential component is provided for the transfer ports, this may promote a swirling velocity for gases within the storage chamber upon arrival of gases through the transfer ports moving with a tangential component. Advantageously, this configuration may therefore promote scavenging and purging out of gaseous molecules or matter located within the storage chamber over time, for example at least partly upon exhaust valve opening for an exhaust stroke and/or during an induction stroke when pressure in the main combustion chamber and ignition chamber may drop below that in the storage chamber, promoting flow out of the storage chamber.

The pre-combustion chamber assembly may be passive, i.e. having no port for the direct injection of fuel into the ignition chamber. The configuration may therefore not be too costly, requiring no special injection port or fuel injector for the pre-combustion chamber itself.

A further aspect of the invention provides a cylinder head for an engine, the cylinder head including a pre-combustion chamber assembly as set out in the first aspect of the invention above.

A further aspect provides an engine including a cylinder head as set out in the previous aspect.

The engine may be a gasoline spark-ignition engine.

The engine may have a four-stroke cycle with a reciprocating piston within a fixed main combustion chamber, the cylinder head having one or two or more poppet-type inlet valves and one or two or more poppet-type exhaust valves. A main combustion chamber of the engine may be configured with at least one squish feature.

The engine may have a gasoline direct injection (GDI) injector communicating directly into a main combustion chamber thereof. Additionally or alternatively, the engine may include a port fuel injection (PFI) injector communicating directly into an air inlet port for the main combustion chamber.

The engine may have no ignition generator for the main combustion chamber to which the pre-combustion chamber assembly is connected, other than a single ignition generator connected with an ignition electrode thereof located inside the ignition chamber of the pre-combustion chamber assembly. In this case, therefore, there will be no spark plug or other spark generator with any terminals located in the main combustion chamber.

Alternatively, a second spark generator such as a spark plug, or second and third such spark generators, may in some embodiments be located each with one or more terminals thereof located inside the main combustion chamber.

The engine preferably includes a catalytic converter located downstream of the main combustion chamber. The engine may include a timing system for the timing of ignition spark made by the spark generator and the ignition timing system may be adapted to retard ignition during a catalytic converter heating phase.

A further aspect of the invention provides a motor vehicle including apparatus as set out in any previous aspect hereof. The motor vehicle may be a volume production motor vehicle registered for use on public roads.

The present invention may be carried out in various ways and some preferred embodiments will now be described by way of example only and in a non-limiting way with reference to the accompanying drawings, in which:

FIG. 1 schematically shows a preferred motor vehicle including a preferred engine and preferred pre-combustion chamber assembly in accordance with the invention;

FIG. 2 schematically shows the engine of the motor vehicle of FIG. 1;

Figure 10:
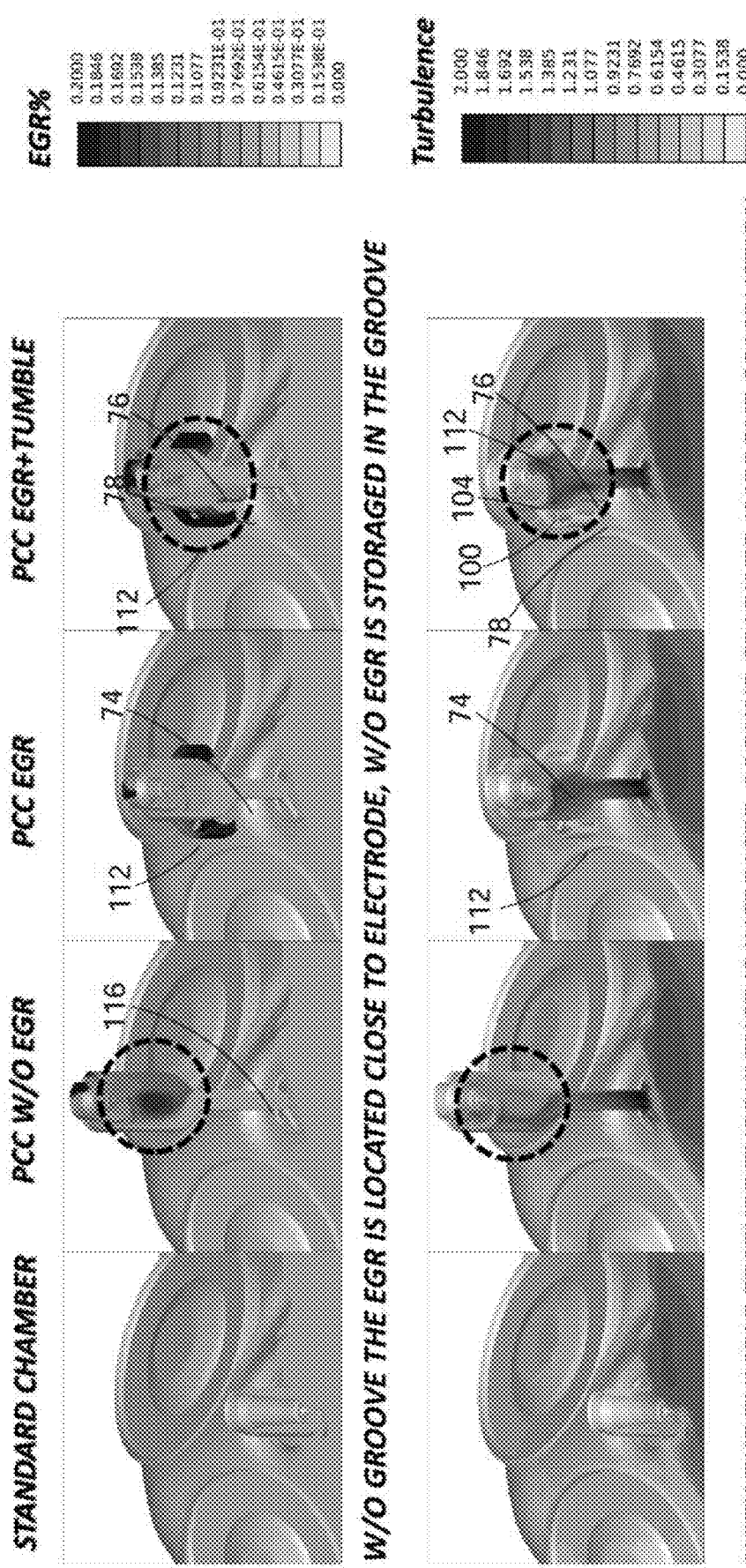
Figure 11:
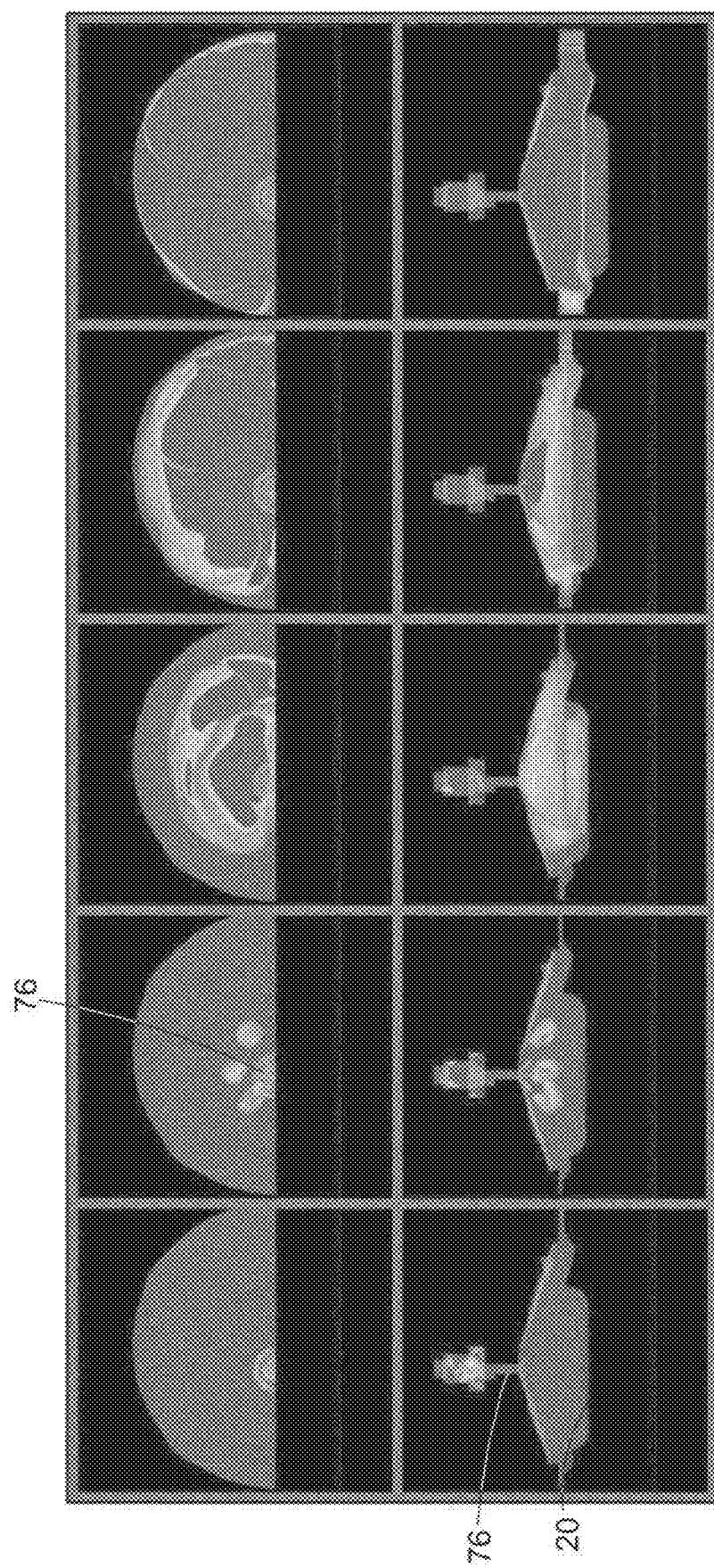
Figure 12:
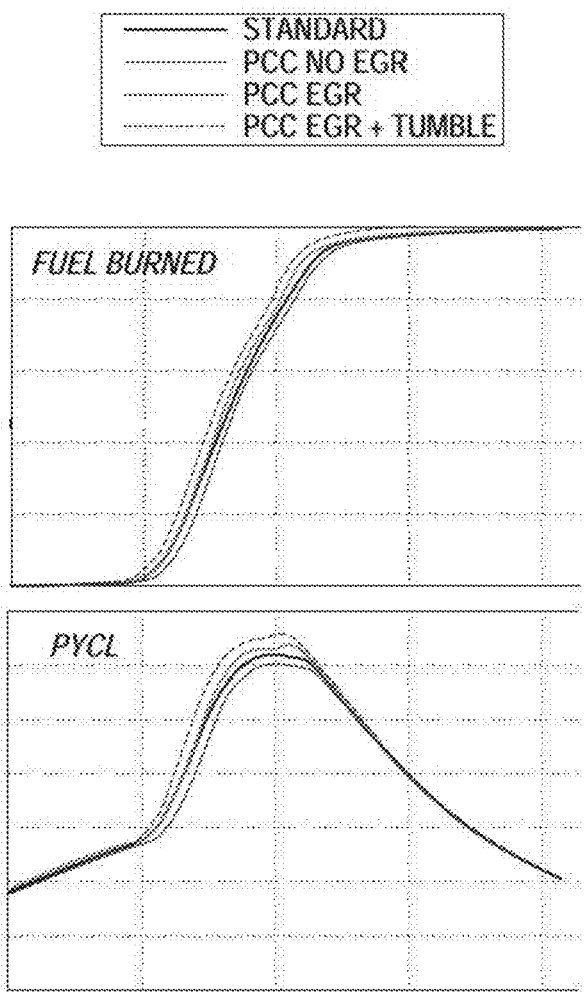
Figure 13:
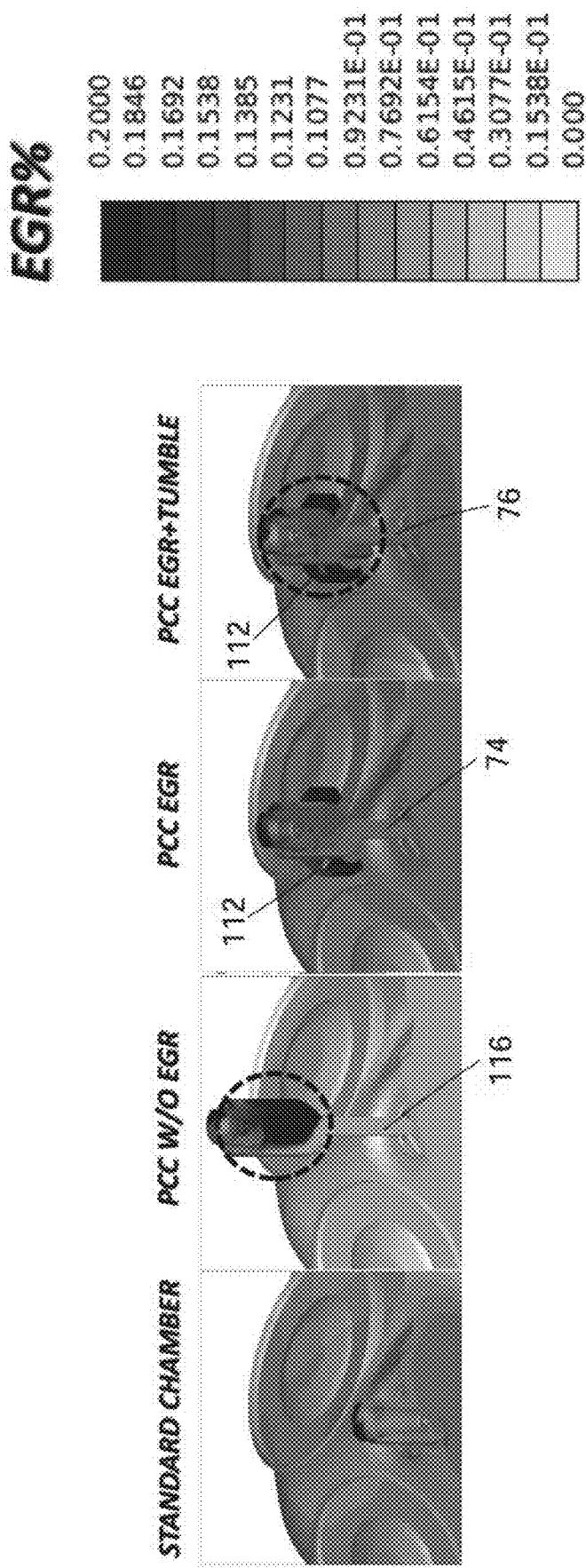
Figure 14:
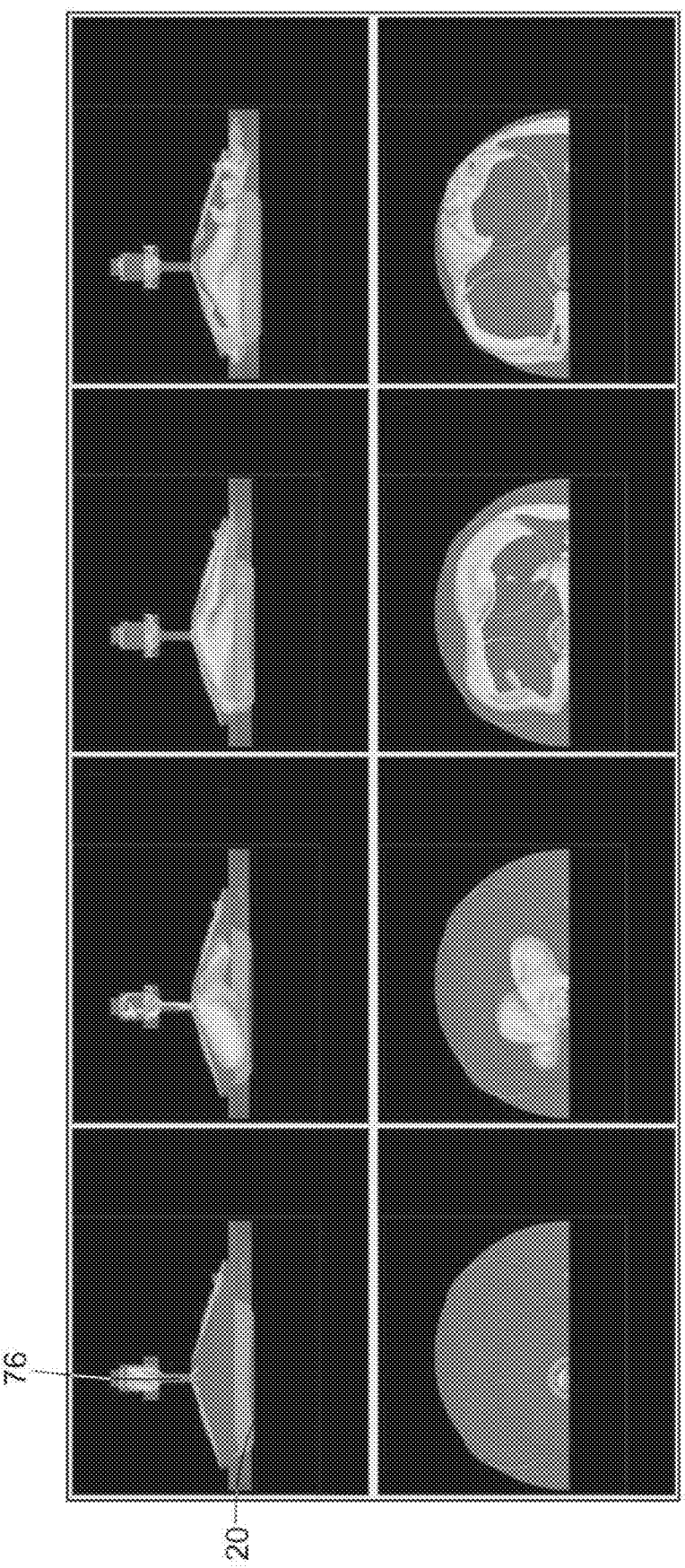
Figure 15:
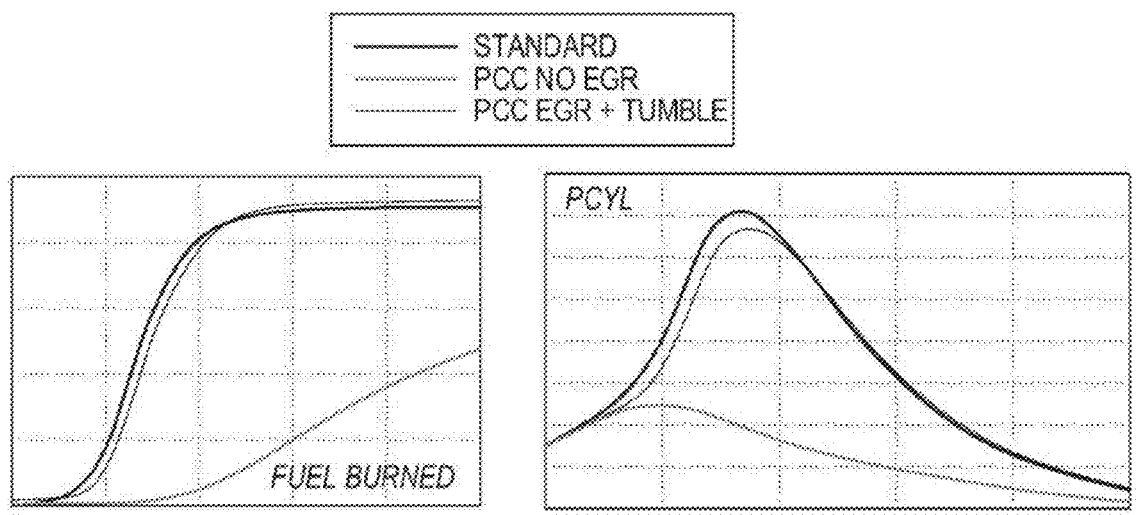
Figure 16:
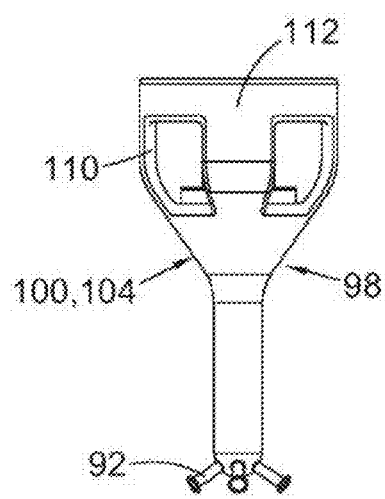

FIG. 10 shows comparative CFD wide open throttle (WOT) exhaust gas residuals percentage and turbulence situations at the time of ignition for a standard chamber, a pre-combustion chamber assembly without an exhaust gas residuals storage space, a preferred pre-combustion chamber assembly with an exhaust gas residuals storage space and a preferred arrangement with an exhaust gas residuals storage space and a tumble feature;

FIG. 11 shows wide open throttle combustion views for simulated CFD flame front propagation for the preferred arrangement of FIG. 10 with an exhaust gas residuals storage space and a tumble feature;

FIG. 12 shows fuel burned and cylinder pressure graphs comparing the four arrangements shown in FIG. 10;

FIG. 13 shows exhaust gas residuals percentage CFD comparisons for the same four arrangements shown in FIG. 10 at low speed with low load, i.e. 2000 RPM at 2 bar BMEP;

FIG. 14 shows flame front propagation CFD views comparable to the first four views (in time) of FIG. 11 but at low speed with low load (2000 RPM at 2 bar BMEP);

FIG. 15 shows comparative fuel burned and cylinder pressure graphs at low speed with low load (2000 RPM at 2 bar BMEP) as in FIGS. 13 and 14 for three of the arrangements shown in FIG. 13, i.e. excluding the version with the pre-combustion chamber assembly without an exhaust gas residuals storage space; and FIG. 16 shows a revised preferred arrangement with at least one and preferably two electrodes being longitudinally located in the pre-combustion chamber between at least one pre-chamber port and at least one transfer port.

Figure 17:
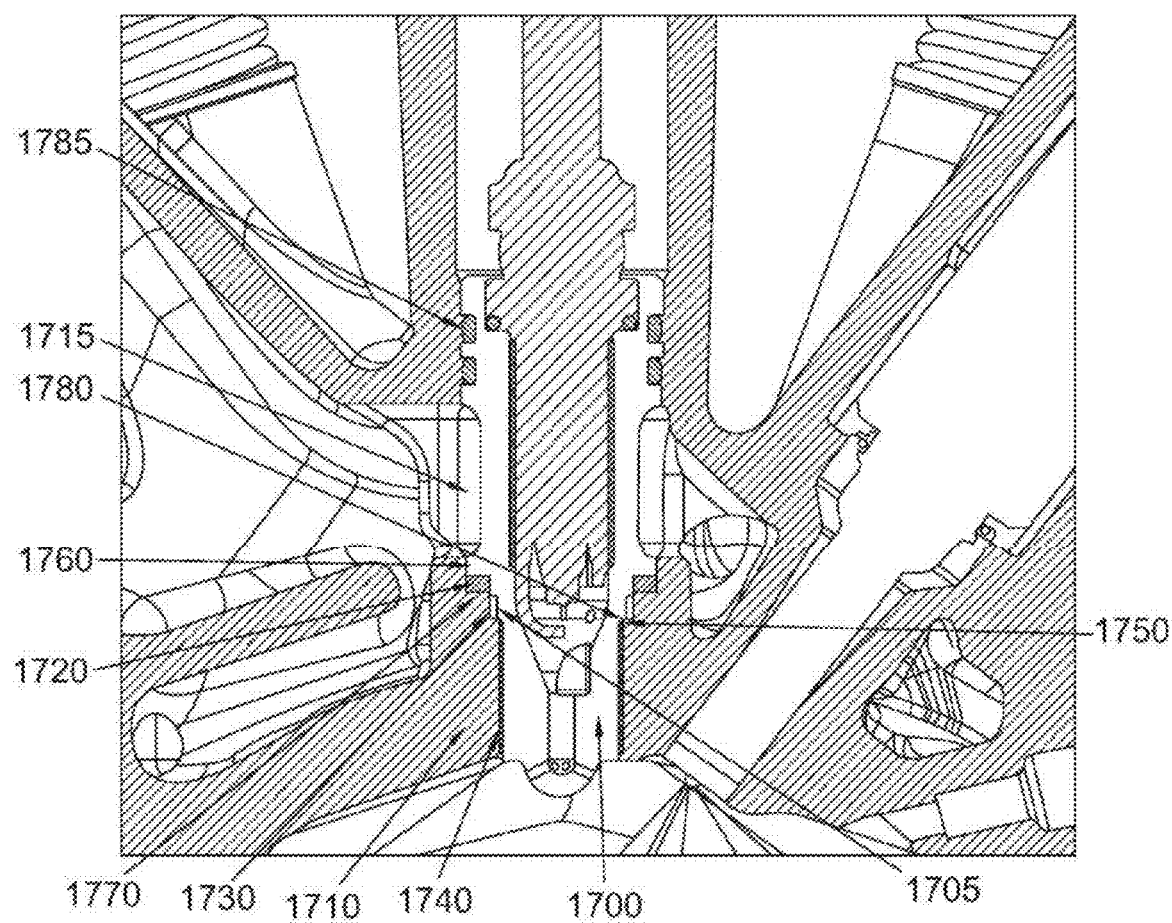

FIG. 17 shows an embodiment with an advantageous arrangement of the exhaust gas residuals storage space.

Figure 18:
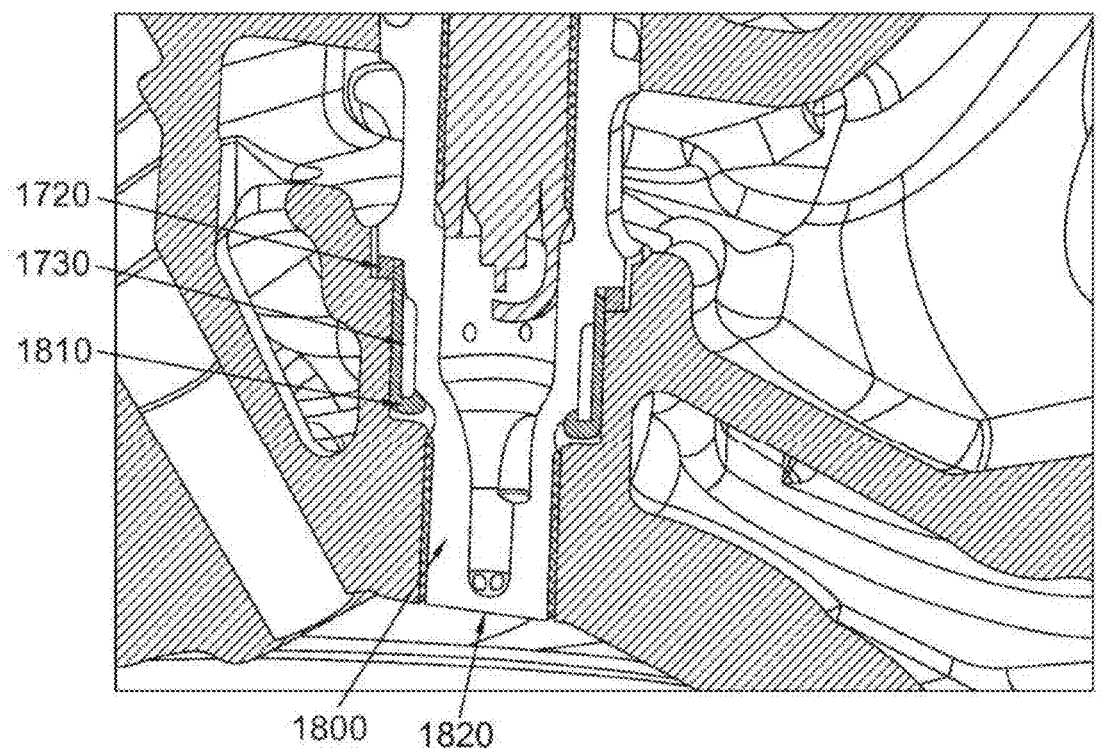

FIG. 18 shows a further alternative embodiment with another advantageous arrangement of the exhaust gas residuals storage space.

Figure 1:
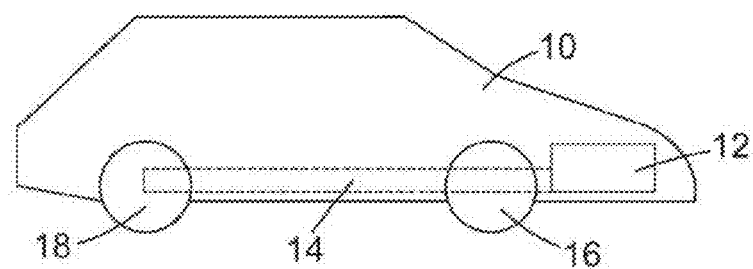

As shown in FIG. 1 a preferred motor vehicle 10 has an engine 12 connected by a powertrain 14 to drive wheels 16, 18.

In other types of vehicles such as motorcycles, there may be only one drive wheel rather than a plurality thereof.

Figure 2:
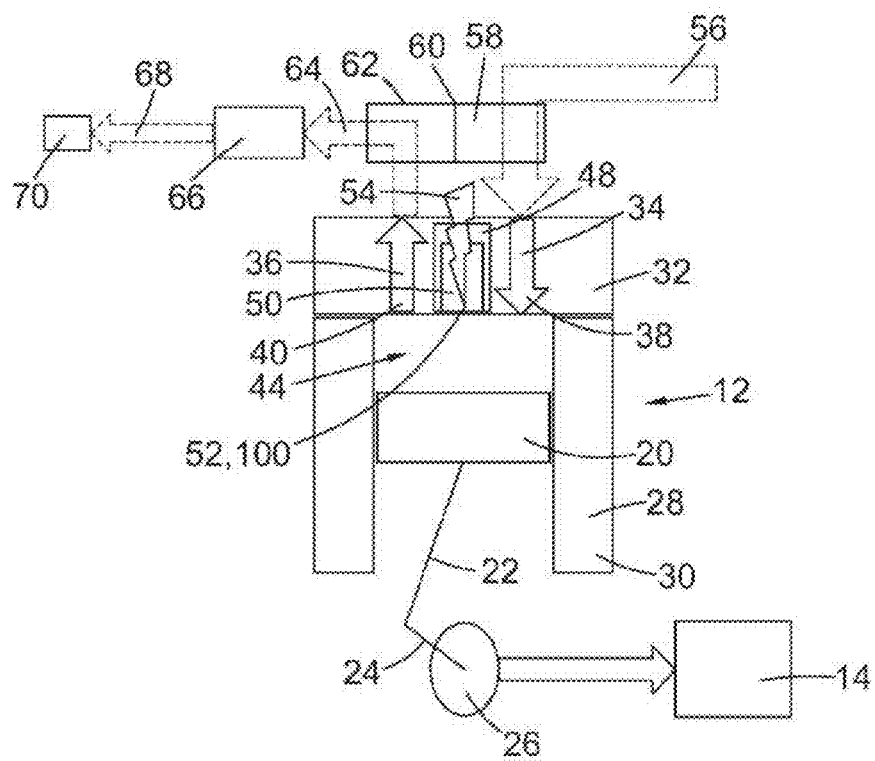

As shown in FIG. 2, the engine 12 is a gasoline spark-ignition engine 12, which may be adapted to run on gasoline with an octane rating in the range of about 90 to 99 RON. The engine has at least one reciprocating piston 20 connected by a conrod 22 to a crank 24 of a crankshaft 26 which is connected to the powertrain 14. The engine may have a single piston 20 or may be configured with a plurality of pistons in configurations such as V-twin, V4, V6, V8, V10 or V12, as well as inline, flat, boxer, H- or W-configuration or other arrangements having the same similar numbers of pistons or more.

Figure 3:
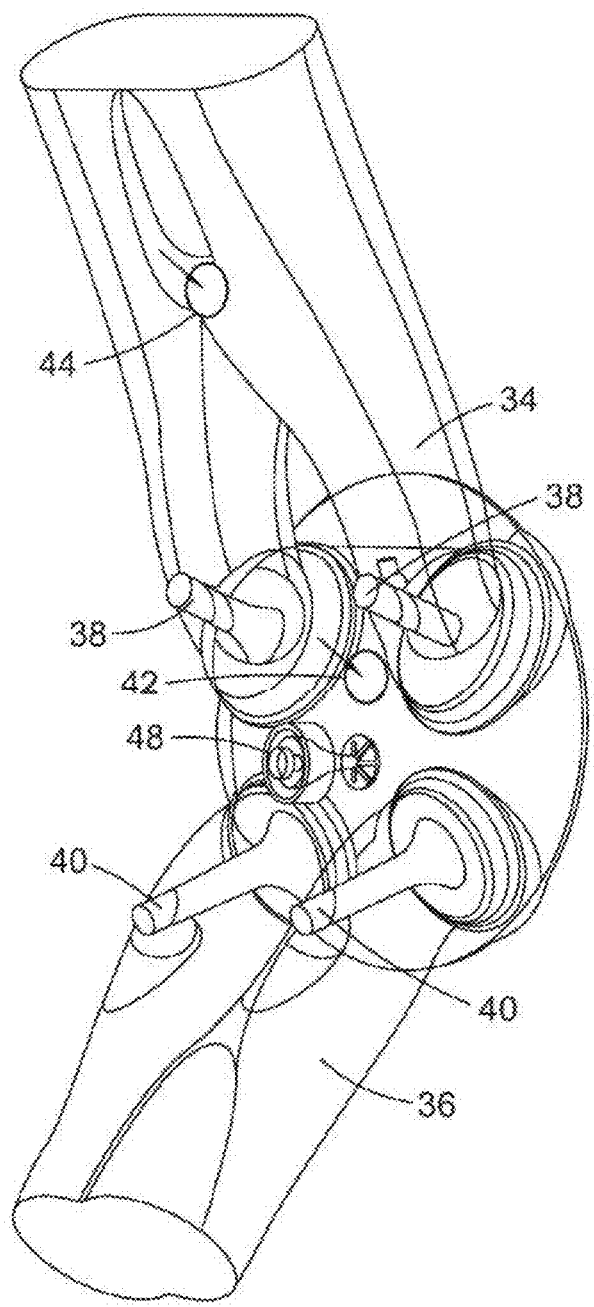
FIG. 3 shows various CFD surfaces of the engine.

The piston 20 runs in a sleeve or cylinder 28 of a block 30. A cylinder head 32 is provided and has at least one inlet port 34 and at least one exhaust port 36 per cylinder 28, with two of each being provide in the depicted embodiment. As shown in FIG. 3, each inlet port 34 is controlled by a poppet-type inlet valve 38 and each exhaust port 36 is controlled by a poppet-type exhaust valve 40. The inlet 38 and exhaust 40 valves are driven by camshafts (not shown) attached to the cylinder head 32 and operated from the crankshaft 26 in a conventional way. A conventional ignition system (not shown) is employed to cause the spark generator 54 to spark with appropriate intensity and timing (advance/retard) in accordance with desired predetermined operating logic.

A gasoline direct injection fuel injector 42 (as shown in FIG. 3) is located to inject fuel into the main combustion chamber 44 which is defined by the piston 20, cylinder 28 and cylinder head 32. An optional port fuel injection fuel injector 44 is shown in this figure (but not in others—it is otherwise assumed to be absent) positioned to inject fuel into the inlet ports 34.

As shown in FIGS. 2 and 3, within the cylinder head 32 there is provided a pre-combustion chamber assembly 48 having an ignition chamber 50 in which at least one electrode tip 52 of a spark generator 54 such as a spark plug is located.

As shown in FIG. 2, an air inlet pathway 56 towards the inlet port 34 may pass through a compressor 58 of a turbocharger or supercharger. In this embodiment, a turbocharger 60 is provided having a turbine 62 adapted mechanically to drive the compressor 58. An exhaust gas pathway 64 passes from the exhaust port 36 through the turbine 62 through a catalytic converter and optional silencing section 66 and exhaust conduiting 68 to tailpipe 70. If desired, an optional intercooler (not shown) may be provided such as downstream of the compressor 58. The turbocharger 60 is optional and may be removed in other embodiments where natural aspiration is desired. In other embodiments there may be no mechanical link between the turbine and compressor. For example, the compressor may be mechanically driven by another component, e.g. ultimately from the crankshaft or the compressor may be electrically driven by a motor. In other embodiments, the turbine may provide electrical power via a generator, some embodiments involving electrical drive of a compressor motor at least partly by the turbine, and some embodiments sharing a common electrical machine acting as both motor and generator on a common shaft between both turbine and compressor.

The skilled person in the art will realise that only part of the CFD (computational fluid dynamics) surfaces of the pre-combustion chamber assembly 48 are shown in FIGS. 3, 4A, 4B, 4C, 4D and 4E. The same is so for the pre-combustion chamber assembly 48 and modifications of it shown in FIGS. 4D, 7, 9, 11, 12, 13 and 14, the surfaces being defined by and/or between a pre-combustion chamber insert 72, the spark generator 54 and, optionally, the cylinder head 32.

The insert 72 may be threadedly connected into the cylinder head 32 and the spark generator 54 may be threadedly connected into the insert 72. The skilled person in the art will note that for manufacturing purposes the insert may be manufactured as at least two interconnectable components. An outer such component may in fact be entirely replaced by material of the cylinder head 32. For example, an L-shaped storage chamber 112 is described below and radially outer surfaces of this may be defined by the material of the cylinder head 32 whereas radially inner surfaces of it may be defined by the insert 72. In some cases, however, such as when additive manufacturing is employed, it is envisaged that the insert 72 may be made as one part fully including the storage chamber 112.

Figure 4:
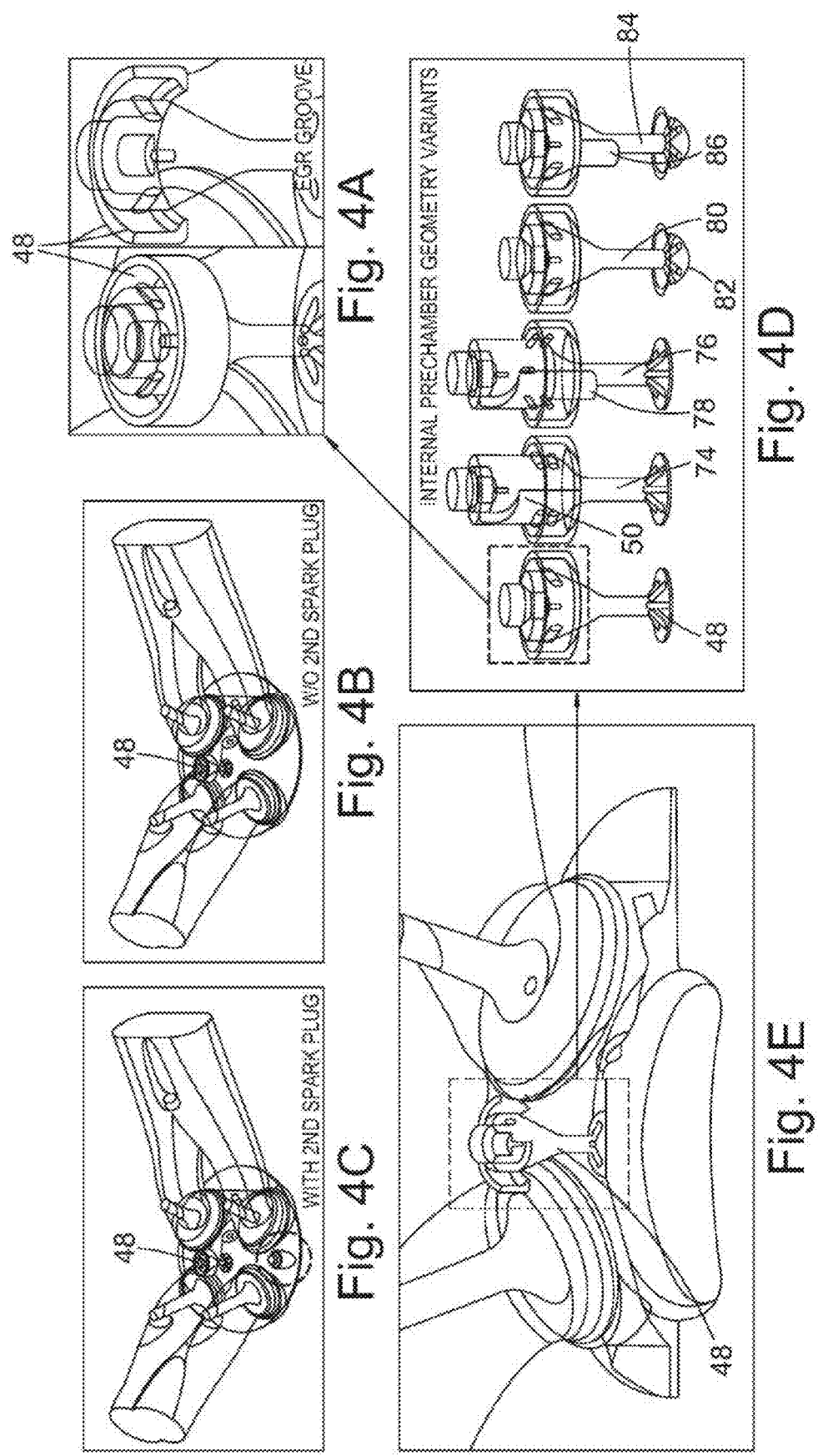
FIG. 4A shows CFD surfaces of a preferred pre-combustion chamber assembly both in isometric and sectioned.
FIG. 4B shows the arrangement shown in FIG. 3 but with the fuel injector ports omitted for the purpose of clarity.
FIG. 4C shows a modification of the arrangement in FIG. 4B but with a second spark plug installed as the modification, the second spark plug communicating directly into the main combustion chamber.
FIG. 4D shows various examples of modifications that can be made to the preferred pre-combustion chamber assembly.
FIG. 4E shows a section through a preferred pre-combustion chamber assembly and cylinder head and inlet/outlet port surfaces as well as inlet and exhaust valves.

As well as the pre-combustion chamber assembly 48, FIG. 4D shows a modified pre-combustion chamber assembly 74 with a longer ignition chamber 50, a second modified pre-combustion chamber 76 which is very similar to the modified pre-combustion chamber 74 with the addition of a tumble step 78, a third modified pre-combustion chamber assembly 80 which is substantially the same as the pre-combustion chamber assembly 48 but with a domed head 82 arranged to extend into the main combustion chamber 44, as well as a fourth modified pre-combustion chamber assembly 84 which is substantially the same as the third modified pre-combustion chamber assembly 82 but modified to include a tumble step 86 or tumble feature.

Figure 5:
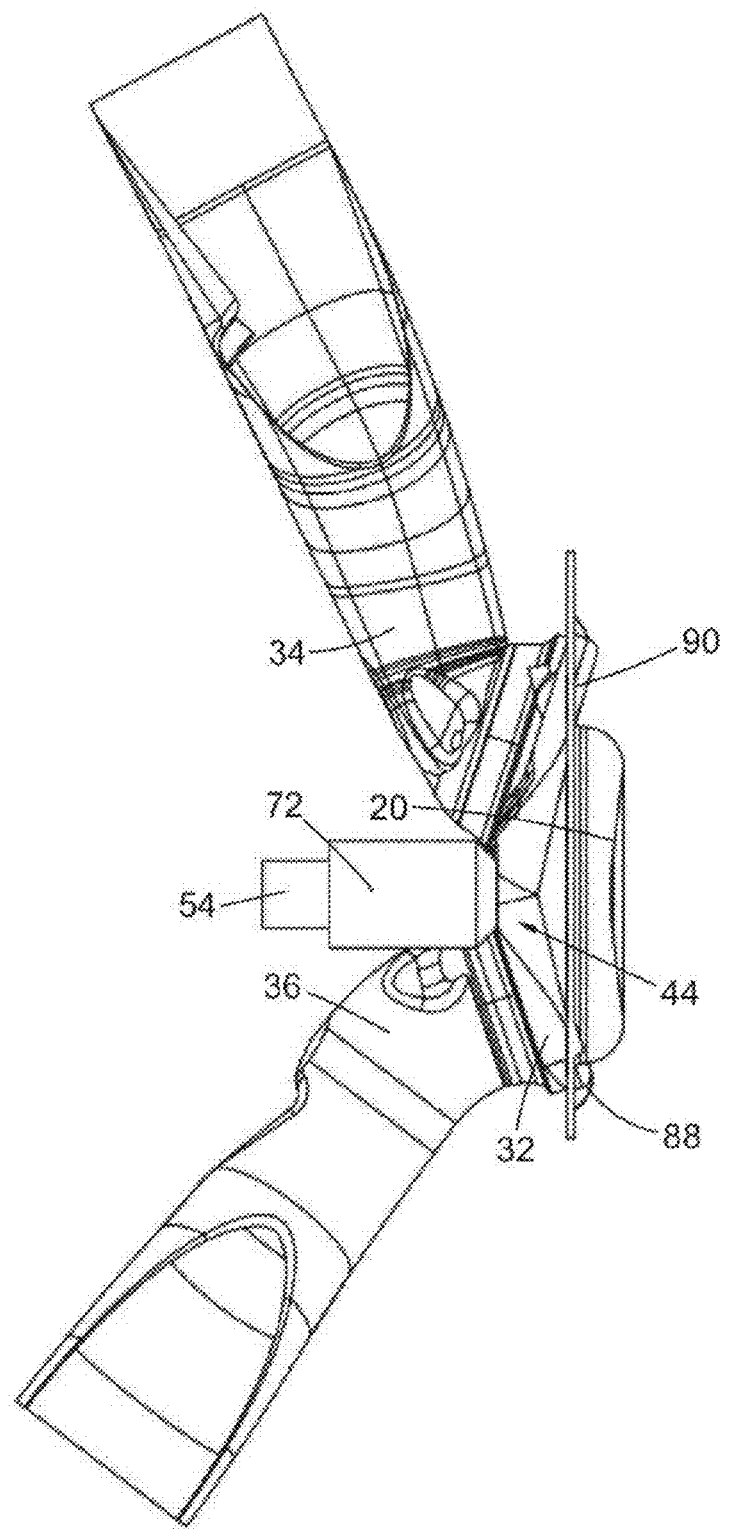
FIG. 5 shows a partly sectioned view through the engine's main combustion chamber, piston, pre-combustion chamber insert and spark plug.
Figure 6:
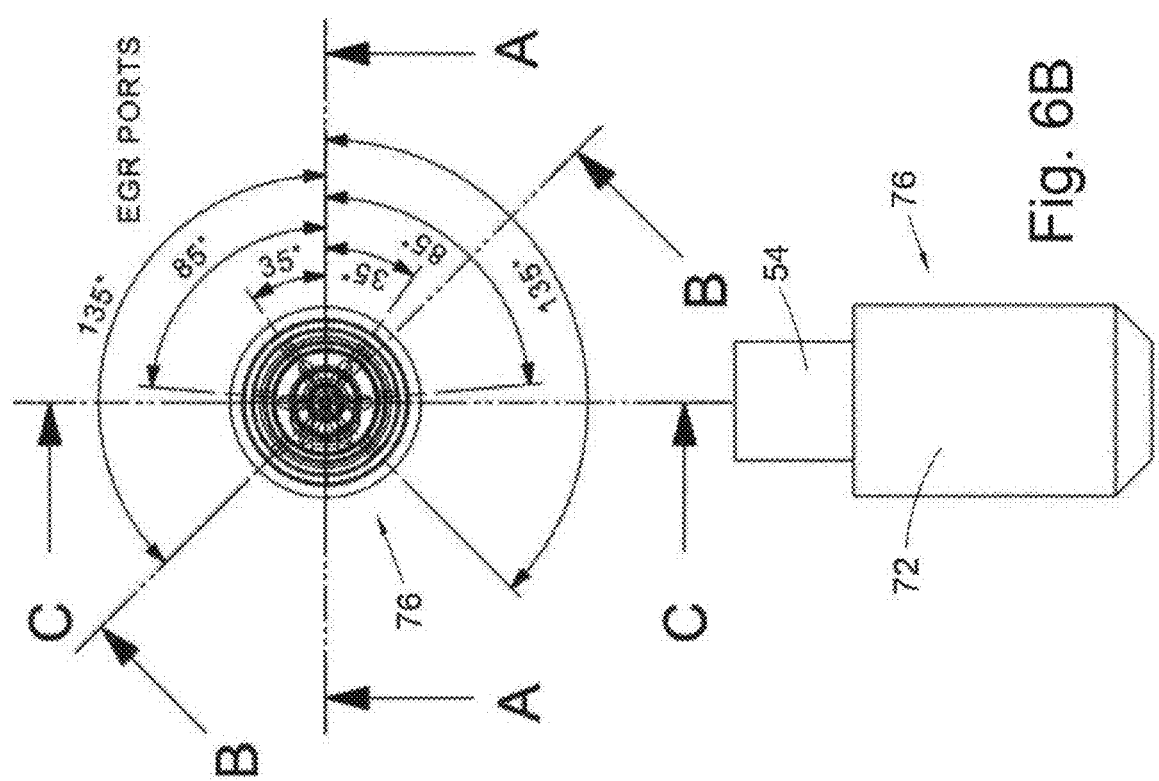
FIGS. 6A, 6B, 6C, 7, 8A, 8B and 8C show detailed views of a modified pre-combustion chamber which is the central one of the five examples shown in FIG. 4D.

As shown in FIG. 5, which shows the piston 20 at approximately top dead centre, the main combustion chamber 44 is provided with at least one squish feature 88, 90. The squish features 88, 90 promote turbulence as the piston 20 approaches top dead centre.

As shown in FIGS. 6A, 6B, 6C, 7, 8A, 8B and 8C which are detailed views of the modified pre-combustion chamber assembly 76 shown in FIG. 4D, the assembly 76 includes a series of six straight cylindrical pre-chamber ports 92 each communicating between a cylindrical entrance port 94 of the ignition chamber 50 and an outlet 96 thereof adapted to communicate directly with the main combustion chamber 44. The pre-chamber ports 92 are arranged in a diverging pattern, diverging away from one another as they head towards the outlets 96 communicating into the main combustion chamber 44 and are slanted at an angle A to a longitudinal axis B of the ignition chamber 50 of about 30 to 65 or 70°, for example about 40 to 60°, to provide diverging jets of ignited gases or gases with flame fronts into the main combustion chamber 44 upon ignition, rapidly igniting the charge in the main combustion chamber 44 with accompanying benefits in reducing knock. In an embodiment, the pre-chamber ports 92 and outlets 96 are evenly spaced around the circumference of the cylindrical entrance port 94. In other embodiments the pre-chamber ports 92 and corresponding outlets 96 are asymmetrically spaced, and/or the pre-chamber ports 92 are differently angled from axis B with respect to each other and/or incorporate the same or differing tangential components to their directions, thereby advantageously allowing the diverging jets of ignited gases to be directed to precise locations within the main combustion chamber 44 as may be determined e.g. by computer modelling to be most effective for reducing knock and/or promoting effective combustion.

The ignition chamber 50 has an ignition region 98 containing at least the tip 52 of a J-shaped ground electrode 100 of the spark generator 54 which is in the form of a spark plug, preferably also containing a tip 102 of a central conductor electrode 104 of the spark generator 54. The spark plug 54 is a spark plug of generally conventional construction known to the skilled person in the art, for example including an insulator portion 106 separating the ground electrode 100 from the central conductor electrode 104. The tip 102 of the ground electrode 100 is substantially centrally located both radially and longitudinally within the ignition region 98 of the ignition chamber 50.

The ignition region 98 of the ignition chamber 50 has a diameter approximately 2 to 5 times greater than the diameter of the cylindrical entrance port 94 (the ignition region 98 also being circularly cylindrical). The diameter of the cylindrical entrance port 94 is approximately 1½ to 4 or 5 times larger than the diameter of the pre-chamber ports 92. Therefore, during ignition between the electrode tips 52, 102 or the electrodes 100, 104 more generally, as pressure rises in the ignition region 98 it gases flow towards the entrance port 94 and then through the pre-chamber ports 92 into the main combustion chamber 44.

The ignition chamber 50 includes a narrowing flaring section 108 between the ignition region 98 and the entrance port 94. Therefore, the narrowing of the ignition region 98 via the narrowing flaring portion 108 into the entrance port 94 tends to accelerate the flow and the flow is preferably also accelerated as it passes from the entrance chamber 94 into the pre-chamber ports 92 as the cross-sectional area of the cylindrical entrance port 94 is preferably larger than the aggregate of the cross-sectional areas of the six pre-chamber ports 92. In some examples, this area of the cylindrical entrance port 94 is about 1.5 to 2.5 times larger than the aggregate area of the pre-chamber ports 92. Therefore, upon ignition by the spark generator 54, fast moving jets of ignited gases or gases with flame fronts are jetted out of the pre-chamber ports 92 into the main combustion chamber 44.

Figure 8A:
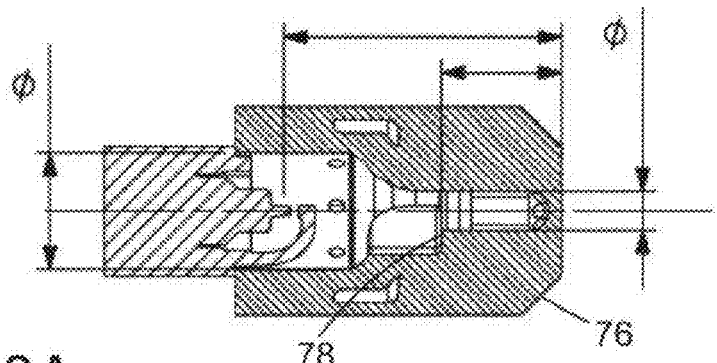
Figure 8B:
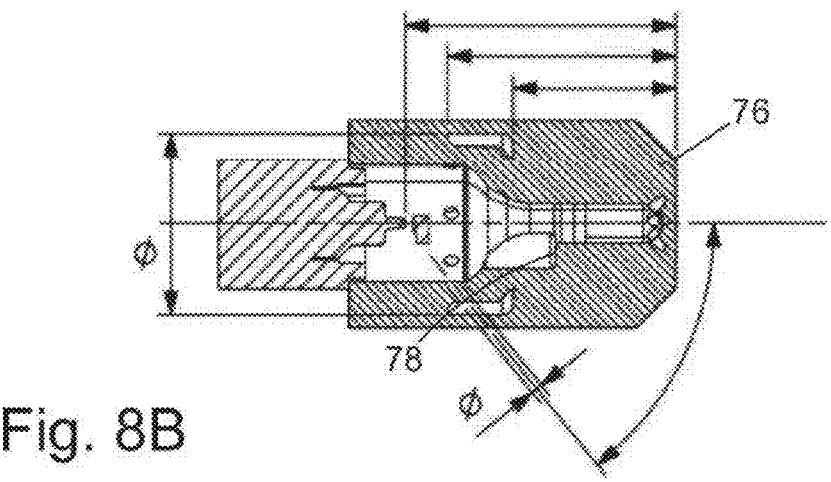
Figure 8C:
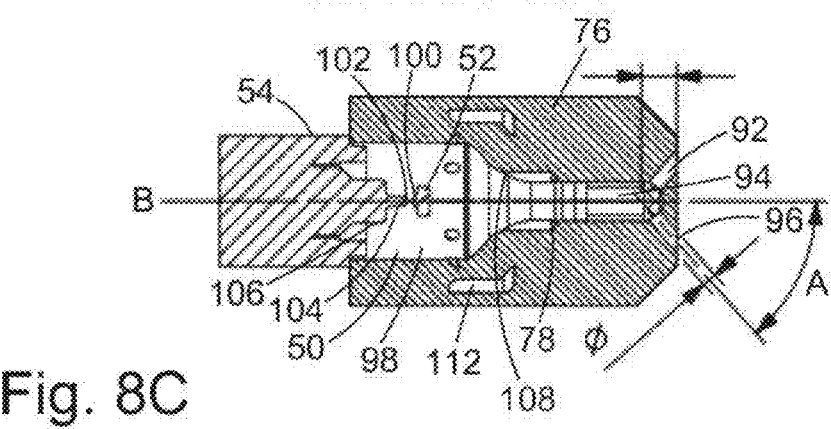

As seen most clearly in FIG. 8A, both also in FIGS. 8B and 8C, the ignition chamber 50 also includes the tumble step 78 or other tumble feature which is located in the region of the narrowing flaring section 108 between the entrance port 94 and the ignition region 98. The sharp tumble step 78 is adapted to detach and make more turbulent the flow passing it into the ignition region 98 during a compression stroke of the piston 20, which is operating under a four-stroke cycle, with compression, power, exhaust and induction strokes, in that order.

The tumble step 78 may also increase the turbulence of the flow exiting the ignition region 98 down into the cylindrical entrance port 94 during ignition roughly at top dead centre at the start of and afterwards during the power stroke, as well as during the induction stroke.

Figure 7:
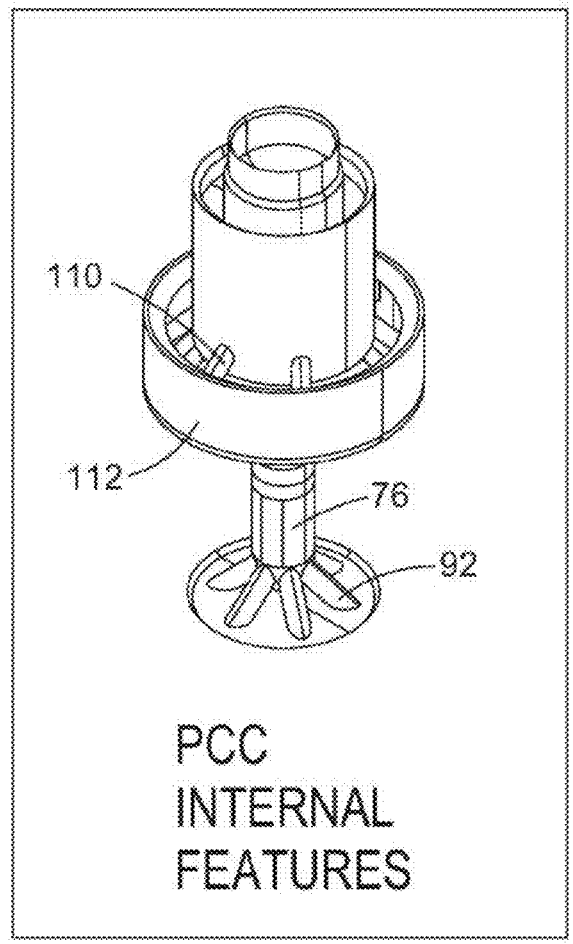

As shown most clearly in FIG. 8B, but also in FIG. 7 and at least partly in FIG. 8C, the ignition region 98 communicates via a series of six transfer ports 110, which are straight cylindrical bores, outwardly into a storage space 112 which is in the form of a toroidal ring surrounding the ignition chamber 50. The transfer ports are generally equispaced around the ignition region 98, although those nearer the tumble step 78 are spaced further apart, at about 90 degrees spacing, than those further from the tumble step 78, which are at about 70 degrees spaced apart from one another.

The toroidal ring 112, which can also be called a groove, has an L-shaped cross-section in sections coincident with the longitudinal axis B as shown in FIGS. 8C, 8B and 8A.

In one example, the volume of the ignition chamber 50 is approximately 1000 cubic millimetres and the volume of the toroidal ring 112 is approximately 200 to 250 cubic millimetres. The ratio of these volumes is therefore approximately between 4:1 and 5:1. In other embodiments, this ratio could be larger or smaller.

With the engine 12 being a spark ignition gasoline engine adapted to operate with an octane rating of about 90 to 99 RON, or higher e.g. 100 RON, the compression ratio may be chosen to be above 8:1 such as about 10 to 13.5 or 14:1, e.g. about 10: to 11:1. The compression ratio may be higher than the ratio that is the volume and the ignition chamber 50 divided by the volume of the storage space 112, such as about 2 to 5 times higher. In some embodiments, the volume of the ignition chamber 50 may be about 1 to 2% of the volume of the main combustion chamber at top dead centre and the volume of the toroidal ring or storage chamber 112 may be about 20 to 25% pf the volume of the ignition chamber 50.

The storage space 112 is entirely sealed with no communication other than directly into the ignition region 98 via the transfer ports 110. The relatively high compression ratio enables significant flushing out of the ignition region 98 with new fuel/air mixture during the compression stroke, the flushing out being at least partially into the storage space 112 via the transfer ports 110. This has the significant benefit that the exhaust gas residuals which were in the ignition region 98 from the power stroke are substantially cleaned out of the ignition region 98 during the compression stroke, providing an excellent mixture for ignition in the region of the electrodes 100, 104 with only a low percentage of exhaust gas residuals present there at ignition. Accordingly, even at low speed with low load and even if the ignition is retarded and the engine is operating in a catalytic converter heating phase, reliable ignition can in the most preferred embodiments be likely to be ensured. The tumble step 78, which is optional, is nevertheless considered further advantageous in helping in the flushing out of the ignition region 98 into the storage space 112 prior to ignition, by providing beneficial extra turbulence thus mixing and flushing out of the ignition region 98. In embodiments, positioning of the transfer ports 110 relative to the tumble step 78 can be selectively optimised so as to enhance this effect, and also to enhance the flushing of the storage space 112 between cycles, for example: by positioning one or more of the transfer ports 110 relatively close to a region of enhanced turbulence produced by the tumble step 78; or by positioning a first transfer port 110 relatively close to a region of enhanced turbulence produced by the tumble step 78, and positioning a second transfer port 110 relatively far away from a region of enhanced turbulence, thereby producing a pressure difference between the first and second transfer ports 110 which encourages a flow through the storage space 112. The magnitude of this flow influences the proportion of a volume of gas that is retained in the storage space 112 from a given cycle to the next cycle compared with a volume of gas that is freshly introduced into the storage space 112 in the next cycle. By manipulating this proportion, advantageous combustion characteristics can be obtained.

Figure 9:
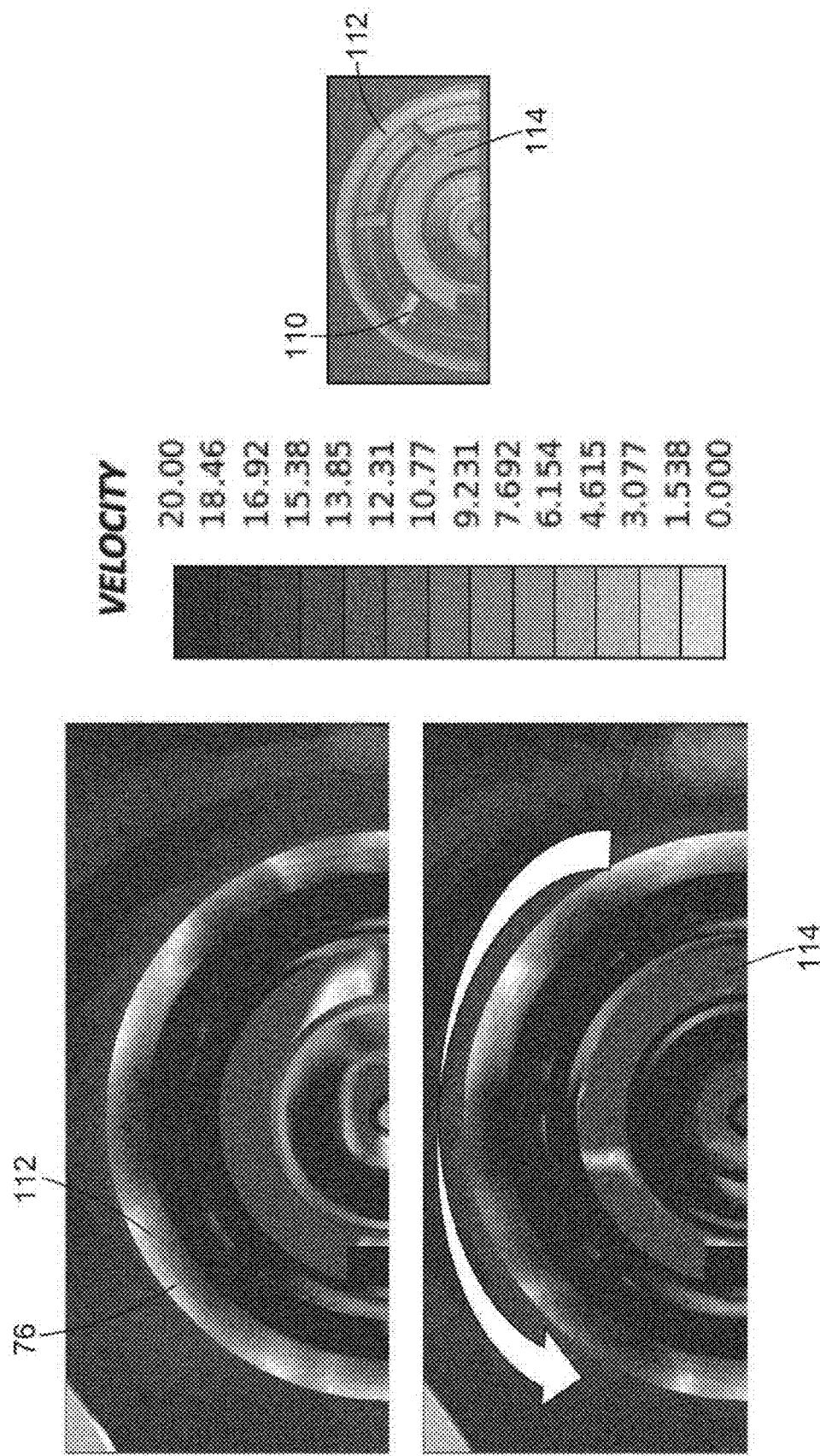
FIG. 9 shows a modified arrangement with transfer ports having a tangential component compared to an arrangement with simply generally radial motion when viewed along the axis of the pre-combustion chamber assembly.

A modification shown in FIG. 9 to the pre-combustion chamber assembly 76 to produce a further modified pre-combustion chamber assembly 114 provides transfer ports 110 with a tangential component, which provides higher velocities within the storage space 112 during gas insertion during the compression stroke than in the pre-combustion chamber assembly 76. As shown by the greyscaling of velocity in FIG. 9, in the modified pre-combustion chamber assembly 76 there are significant proportions of the storage space 112 with velocities under 5 metres per second. In contrast, in the further modified pre-combustion chamber assembly 114 there are significant proportions of the volume of the storage space 112 where the velocity is above 10 metres per second, i.e. in an anticlockwise direction as shown in FIG. 9. This is therefore indicative in this CFD simulation that the alignment of the transfer ports 110 with a tangential component beneficially promotes movement in the storage space 112 during the compression stroke and it is indicative that on the exhaust and induction strokes when there is a pressure drop inside the ignition chamber 50, the gases in the storage chamber 112 will be effectively at least partially flushed out. This, therefore, promotes the replacement of the gases in the storage space so that the same molecules are not simply cycled in and out but they are scavenged and replaced with other molecules as the engine 12 operates. Similarly, asymmetric sizing, spacing, and/or direction of the transfer ports 110 can be employed, in embodiments, to promote scavenging of the gases in the storage space 112. Additionally, the positioning of the transfer ports 110 relative to the ignition region 98 can be chosen so as to maximise the proportion of spent gases to fresh mixture that is transferred into the storage space 112, thereby minimising the passage of fresh mixture past the ignition region 98 into the storage space 112, and so maximising the proportion of fresh mixture to spent gases remaining in the ignition region 98 around the time of ignition (e.g. when the crank is at or near top dead centre). For example, siting the transfer ports 110 nearer the pre-chamber ports 92 promotes filling of the storage space 112 with fresh mixture upon the compression stroke, whereas siting the transfer ports 110 nearer to the ignition region 98 promotes filling of the storage space 112 with spent gases. The relative volumes of main combustion chamber 44, ignition chamber 50, and storage space 112 can advantageously be tuned so that, in each compression stroke, fresh mixture reaches the ignition region 98 but does not flow significantly past the ignition region 98 into the storage space 112, thereby maximising the efficiency with which mixture is combusted in the ignition chamber 50. For example, increasing the volume of the storage space 112 relative to the volume of the ignition chamber 50 will tend to increase the volume of gas that flows past the ignition region 98 into the storage space 112, and increasing the volume of the main combustion chamber 44 relative to the volumes of the storage space and ignition chamber 50 will tend to increase the volume of gas that flows into both upon the compression stroke.

The features (particularly including the storage space 112, tumble step 78, deformable washer, flat interface surface, and associated refinement features) described herein are particularly advantageous for improving the operation of a "passive" ignition pre-combustion chamber that has no provision for internal injection of fresh fuel/mixture (aside from the fresh mixture that is pressed into the pre-combustion chamber from the main combustion chamber 44 during the compression stroke), however the described features are also correspondingly advantageous when used an "active" pre-combustion chamber having provision for internal fuel/mixture injection.

FIG. 10 shows exhaust gas residuals percentages and turbulence for various configurations simulated at wide open throttle (WOT). The exhaust gas residuals percentages and turbulences are depicted in greyscale.

In the exhaust gas residuals percentage diagrams, it is seen that a pre-combustion chamber without any storage space 112 or tumble step has a high exhaust gas residuals percentage according to the CFD analysis, in the region of 17 to 20% at the planned time of ignition, this high percentage being likely to cause ignition failure. With the modified pre-combustion chamber assembly 74 having a storage space 112 but no tumble step, it is seen that the exhaust gas residuals percentage at the proposed time of ignition is certainly under 12 or even under 10%. In contrast, within the storage space 112, the exhaust gas residuals percentage is simulated as being high, i.e. apparently between about 16 and 20%, indicating that exhaust gas residuals within the ignition chamber 50 have been successfully purged out into the storage space 112. Similar excellent results are achieved in the CFD simulation in the modified pre-combustion chamber assembly 76 having the tumble step 78. The turbulence simulation indicates improved turbulence especially around the electrodes 104, 100 which will further improve combustion in the pre-combustion chamber assembly 76 compared to the pre-combustion chamber 74 and the arrangement with no ring-shaped storage space 112.

The simulations in FIG. 11 are also at wide open throttle and show a series of bottom-up and side section views against time/crank angle as will be appreciated by the skilled person in the art. The two left-hand views are at approximately top dead centre after the compression stroke and ignition is seen to be occurring within the ignition region 98 and, indeed, in the storage space 112. The next two views show that strong jets of ignited gases have been ejected into the main combustion chamber 44 with flame combustion diverging away from the central axis of the pre-combustion chamber assembly 76. In the later views the flame front propagation is depicted spreading across the whole volume of the main combustion chamber 44.

FIG. 12 shows wide open throttle graphs of fuel burned and cylinder pressure (PCYL) against time/crank angle. The fuel burned graph shows that in both of the PCC EGR and PCC EGR plus tumble arrangements, i.e. using the pre-combustion chamber assembly 74 without a tumble step and the pre-combustion chamber assembly 76 with a tumble step (both having a ring-shaped storage space 112), the fuel burn is quicker due to quicker flame front propagation than in the standard chamber shown in FIG. 10 as well as in the pre-combustion chamber assembly without a storage space 112 shown in FIG. 10. The pre-combustion chamber with the tumble step 78 and exhaust gas residuals storage space 112 performs the best. The same is so in the cylinder pressure chart where it can be seen that the sum of the cylinder pressure over time is the highest using the pre-combustion chamber assembly 76 having the tumble step 78 and the storage space 112, with the arrangement 74 with the exhaust gas residuals storage space 112 but without the tumble step being just below in second place. It is clear that at wide open throttle, from this simulation, there will be a high knock improvement as well as lower exhaust gas residuals near the spark plug using the arrangements in the present embodiments having the storage space 112.

FIGS. 13, 14 and 15 show CFD results for low speed with low load, i.e. at a test setting of 2000×2, which is at 2000 RPM at 2 bar BMEP. Even at this low speed/load, the arrangements 74, 76 with the storage space 112 show low levels of exhaust gas residuals near the spark plug electrodes 100, 104 at the proposed time of ignition. In contrast, using a pre-combustion chamber without the storage space 112 of the embodiments described, there is shown to be a very high level of exhaust gas residuals near the spark plug electrodes 100, 104.

This means that ignition is highly likely to be reliable using the pre-combustion chamber assemblies 74, 76, yet ignition may entirely fail in the pre-combustion chamber assembly 116 without the storage space 112 of the described embodiments. Likewise, the flame front simulations of FIG. 14 show excellent flame front propagation at the low load condition.

As shown in FIG. 15, with the pre-combustion chamber assembly 116 without the storage space 112 or tumble step, ignition failure is simulated to occur with very low fuel burn and cylinder pressure results depicted in the graphs. In contrast, with the arrangement of the pre-combustion chamber assembly 76 having the storage space 112 and the tumble step 78, the fuel burn and cylinder pressure graphs are very similar to those for the standard chamber shown in FIG. 12 which has no pre-combustion chamber but the spark plug electrodes sitting in a more traditional fashion within the main combustion chamber 44. Therefore, with the arrangements 74, 76 having the storage space 112 even at low speed/load, the exhaust gas residuals are well stored inside the groove/toroidal ring-shaped storage space 112 by the time of ignition and there is no ignition problem.

Accordingly, from low load up to wide open throttle, excellent combustion performance is simulated as being achieved.

FIG. 16 shows a revised arrangement in which the storage chamber 112 is located further from the main combustion chamber 44 than the spark plug electrodes 100, 104. The electrodes 100, 104 are longitudinally between the transfer ports 110 and the pre-chamber ports 92 which may provide advantageous flushing of the ignition region 98 of exhaust gas residuals as flow may pass directly past the electrodes 100, 104 on the way from the pre-chamber ports 92 to the transfer ports 110 and storage chamber 11. In certain cases such as this, the large transfer ports 110 (which may alternatively be considered an intermediate purge region) may be considered part of the storage space 110.

In an advantageous embodiment, referring to FIG. 17, a generally tubular body 1700 of the ignition chamber, having a portion 1705 that has an outer diameter, is arranged to be inserted within a cylindrical void in the cylinder head 1710, the outer diameter of the portion 1705 being smaller than an inner diameter of a corresponding portion of the cylindrical void such that a space corresponding to the storage chamber 1730 exists therebetween at a region along the axis of the body 1700. In said embodiment, a shoulder 1780 of increased diameter is provided on the body 1700 such that when the body 1700 is inserted into the cylindrical void in the cylinder head 1710, the shoulder 1780 on the body 1700 seats against a first seating portion 1750 at a boundary of the cylindrical void of the cylinder head 1710, thereby delimiting a first axial end of the storage chamber 1730. In said embodiment, the body 1700 further has a circumferential ring or abutment 1760, which seats against a second seating portion 1770 of the cylinder head 1710 when the body 1700 is inserted into the cylinder head 1710, thereby delimiting a second axial end of the storage chamber 1730. The abutment 1760 is located axially away from the ignition chamber tip compared with the shoulder 1780, and similarly the second seating portion 1770 is located axially away from the main combustion chamber compared with the first seating portion 1750 in the cylindrical void of the cylinder head 1710. In an embodiment, the body 1700 has a threaded or interference-fit portion 1740 which engages with a corresponding portion of the cylinder head 1710 to retain the body 1700 in the cylinder head 1710, and a deformable washer 1720 (e.g. a copper or aluminium crush washer) is situated between the abutment 1760 and the second seating portion 1770 of the cylinder head 1710 so as to effect a gas tight seal. The crushable nature of the deformable washer 1720 provides that seating of the shoulder 1780 of the body 1700 against the first seating portion 1750 of the cylinder head, to seal a first axial end of the storage chamber 1730, can more easily and practically be effected in tandem with seating of the abutment 1760 against the second seating portion 1770 to seal a second axial end of the storage chamber 1730, e.g. without requiring excessively small machining tolerances to match the dimension between the shoulder 1780 and abutment 1760 of the body 1700 with the dimension between the first 1750 and second 1770 seating portions of the cylinder head 1710. The transfer ports 110 (not shown in FIG. 17) can advantageously be formed in the wall of the body 1700 at the region corresponding to the portion 1705 such that the transfer ports 110 provide for the ignition chamber 50 to communicate with the storage chamber 1730 thus formed when the body 1700 is installed in the cylinder head 1710.

Thus, an ignition chamber that communicates with a storage chamber 1730 is conveniently, easily and cheaply provided.

Optionally, said body 1700 of the ignition chamber can incorporate one or more features such as a groove or thinned section 1715, drilling and/or surface area enhancement for interfacing with a cooling channel and/or coolant in a cylinder head 1710 into which the ignition chamber is installed when in use. Such features advantageously enhance transfer of heat from the body 1700 of the ignition chamber to coolant circulating in the cylinder head 1710, thereby reducing temperatures and thereby reducing, at least to an extent, tendency for pre-ignition within the ignition chamber. Above said groove 175, one or more O-rings 1785 can be employed to seal the cooling channel from the engine exterior.

Referring to FIG. 18, in an alternative embodiment, the body 1800 of the ignition chamber is surrounded by a collar 1810 in the region of the transfer ports 110, such that the storage chamber 1830 is formed between the body 1800 and the collar 1810, which is sealed around the body 1800 (e.g. by interference fit and/or welding) and thereby advantageously provides for containment of the EGR gases in the event that the deformable washer 1720 is not able to provide a gas tight seal. Further, in some embodiments, the tip 1820 of the ignition chamber body 1800 is substantially flat as shown in FIG. 18 (in other words each pre-chamber port interfaces with a surface of the main combustion chamber which is substantially flat, although in other embodiments the tip 1820 may be convexly domed to at least an extent), which is advantageous in terms of reducing heat transfer from combustion into the ignition chamber body 1800, which reduces knocking tendency. Furthermore, not shown in the Figures, the top of the body 1700, 1800, may be provided with a tubular portion extending away from the cylinder head along the axis of the body 1700, 1800, and provided with a hollow fastener head (e.g hexagonal ring nut, the interior of which permits attachment of an ignition lead to the spark plug in the ignition chamber) for engagement with a tool for rotationally urging the threaded portion 1740 into engagement with a corresponding thread in the cylinder head.

Various modifications may be made to the preferred embodiments described herein without departing from the scope of the invention as defined by the accompanying claims.

The invention claimed is:

1. A pre-combustion chamber assembly for a spark ignition engine, the assembly comprising:
   an ignition chamber adapted to contain at least one electrode of a spark generator; and
   the ignition chamber being adapted to communicate with a main engine combustion chamber via a plurality of pre-chamber ports;
   wherein the ignition chamber communicates for removal therefrom of exhaust gas residuals to a distinct storage chamber via at least one transfer port,
   wherein the ignition chamber includes a single substantially cylindrical entrance channel extending directly from said pre-chamber ports in a direction towards an ignition region of the ignition chamber, the ignition region having a larger cross-section than the entrance channel, and
   wherein the entrance channel and the ignition region are joined by a flaring chamber connector wall extending outwardly from the entrance channel to the ignition region.

2. An assembly as claimed in claim 1 in which the ignition region is substantially circularly cylindrical.

3. An assembly as claimed in claim 2 in which the ignition region has a diameter between 2 to 5 times that of the entrance channel.

4. An assembly as claimed in claim 1 in which the ignition chamber includes a tumble feature adapted to promote flow tumble: the tumble feature being radially aligned with a ground electrode of the spark generator to be mounted with the pre-combustion chamber assembly.

5. An assembly as claimed in claim 4 in which the tumble feature is a step surface located in the region of the flaring chamber wall.

6. An assembly as claimed in claim 1 in which the ignition chamber has a longitudinal direction and is adapted to connect at one end thereof to a substantially coaxially oriented spark generator in the form of a spark plug, in which the ignition chamber is adapted to contain a tip of a ground electrode of a spark plug substantially in the centre of the ignition region.

7. An assembly as claimed in claim 1, in which wall features of the ignition chamber near where a spark generator is to be contained are of a copper-beryllium material.

8. An assembly as claimed in claim 1, in which wall features of the ignition chamber distal from where a spark generator is to be contained are of steel, and optionally are 316 stainless steel.

9. An assembly as claimed in claim 1, in which said pre-chamber ports are configured in an equispaced pattern, in which the pre-chamber ports diverge from one another in a direction away from the ignition chamber.

10. An assembly as claimed in claim 9, in which the pre-chamber ports are straight cylindrical tubes each orientated at an angle diverging from a longitudinal direction of the ignition chamber of about 30 to 60°.

11. An assembly as claimed in claim 9, in which there are six said pre-chamber ports and the diameter of the entrance channel is about 2 to 4 times the diameter of each pre-chamber port.

12. An assembly as claimed in claim 9, in which each pre-chamber port interfaces with a surface of the main combustion chamber which is convexly domed.

13. An assembly as claimed in claim 1, in which the storage chamber is adapted to communicate only with the ignition chamber, otherwise being fully sealed.

14. An assembly as claimed in claim 1, in which the storage chamber is a toroidal ring in shape, and the storage chamber is adapted to be located within a cylinder head assembly for an engine.

15. An assembly as claimed in claim 1, in which the ignition chamber has a 2 to 10 times larger volume than the storage chamber.

16. An assembly as claimed in claim 1, which includes a series of said transfer ports communicating at spaced apart locations into the ignition chamber; at least one said transfer port communicating into the ignition chamber at a first longitudinal position of the ignition chamber, at least one electrode tip of a spark generator being longitudinally between the first longitudinal location and a pre-chamber port.

17. An assembly as claimed in claim 1 in which each said at least one transfer port has a cross dimension or diameter which is between 5% and 20% of a cross dimension or diameter of the ignition region of the ignition chamber.

18. An assembly as claimed in claim 1, in which each said at least one transfer port is arranged in a direction which is a substantially radial direction, or having a tangential component, when viewed along a longitudinal direction of the assembly.

19. An assembly as claimed in claim 1, which is passive, having no port for direct fuel injection into the ignition chamber.

20. An engine having a cylinder head, the cylinder head including an assembly as claimed in claim 1.

21. An engine as claimed in claim 20 which has a gasoline direction injection (GDI) injector communicating directly into a main combustion chamber thereof; optionally including a port fuel injection (PFI) injector communicating directly into an air inlet port for the main combustion chamber.

22. An engine as claimed in claim 20 which has no ignition generator for the main combustion chamber to which the pre-combustion chamber assembly is connected other than a single ignition generator connected with at least one ignition electrode thereof located inside the ignition chamber.

23. A motor vehicle including an engine as claimed in claim 20.

\* \* \* \* \*